(12) United States Patent
Adamson et al.

(10) Patent No.: US 10,235,399 B2
(45) Date of Patent: Mar. 19, 2019

(54) METHODS AND SYSTEMS FOR DETERMINING HARDWARE SIZING FOR STORAGE ARRAY SYSTEMS

(71) Applicant: HEWLETT PACKARD ENTERPRISE DEVELOPMENT LP, Houston, TX (US)

(72) Inventors: David Adamson, San Mateo, CA (US); Larry Lancaster, Alameda, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 151 days.

(21) Appl. No.: 14/932,120

(22) Filed: Nov. 4, 2015

(65) Prior Publication Data

US 2016/0124652 A1    May 5, 2016

Related U.S. Application Data

(60) Provisional application No. 62/075,853, filed on Nov. 5, 2014.

(51) Int. Cl.
*G06F 12/08* (2016.01)
*G06F 17/30* (2006.01)
*G06F 12/0873* (2016.01)

(52) U.S. Cl.
CPC ........ *G06F 17/30312* (2013.01); *G06F 12/08* (2013.01); *G06F 12/0873* (2013.01); *G06F 17/30306* (2013.01)

(58) Field of Classification Search
CPC .... G06F 11/34; G06F 12/023; G06F 12/0653; G06F 12/08; G06F 12/0879; G06F 12/10;
(Continued)

(56) References Cited

U.S. PATENT DOCUMENTS 5,201,000 A * 4/1993 Matyas ............... G06F 9/30003
380/30
5,732,240 A * 3/1998 Caccavale ............... G06F 11/32
710/56
(Continued)

OTHER PUBLICATIONS

The MathWorks, Inc., "How the Genetic Algorithm Works," Jun. 27, 2013, 4 pages. <https://web.archive.org/web/20130627025410/https://www.mathworks.com/help/gads/how-the-genetic-algorithm-works.html>.

(Continued)

*Primary Examiner* — Mano Padmanabhan
*Assistant Examiner* — Andrew J Cheong
(74) *Attorney, Agent, or Firm* — Hewlett Packard Enterprise Patent Department

(57) ABSTRACT

Methods and systems for enabling sizing of storage array resources are provided. Resources of a storage array can include, for example, cache, memory, SSD cache, central processing unit (CPU), storage capacity, number of hard disk drives (HDD), etc. Generally, methods and systems are provided that enable efficient predictability of sizing needs for said storage resources using historical storage array use and configuration metadata, which is gathered over time from an install base of storage arrays. This metadata is processed to produce models that are used to predict resource sizing needs to be implemented in storage arrays with certainty that takes into account customer-to-customer needs and variability. The efficiency in which the sizing assessment is made further provides significant value because it enables streamlining and acceleration of the provisioning process for storage arrays.

20 Claims, 19 Drawing Sheets

(58) Field of Classification Search
CPC .. G06F 12/1045; G06F 13/1668; G06F 13/28; G06F 13/387; G06F 13/4018; G06F 15/0225; G06F 15/0283; G06F 1/1628; G06F 2201/86; G06F 2212/401; G06F 3/04883; G06F 17/30312; G06F 17/30306; G06F 12/0873

See application file for complete search history.

(56) References Cited

U.S. PATENT DOCUMENTS

| | | | | | |
|---|---|---|---|---|---|
| 5,848,270 | A * | 12/1998 | DeLuca | G06F 9/50 | 718/102 |
| 6,456,597 | B1 * | 9/2002 | Bare | H04L 29/12009 | 370/252 |
| 6,542,854 | B2 * | 4/2003 | Yang | G06F 11/3409 | 702/108 |
| 6,560,587 | B1 * | 5/2003 | Early | G06F 17/18 | 422/82.09 |
| 6,687,765 | B2 * | 2/2004 | Surugucchi | G06F 3/0605 | 710/15 |
| 6,978,259 | B1 * | 12/2005 | Anderson | G06F 3/0605 | 706/19 |
| 7,120,759 | B2 * | 10/2006 | Chiu | G06F 12/0862 | 711/147 |
| 7,292,969 | B1 * | 11/2007 | Aharoni | G06F 11/3419 | 703/21 |
| 8,010,337 | B2 * | 8/2011 | Narayanan | G06F 11/3419 | 703/22 |
| 8,112,586 | B1 * | 2/2012 | Reiner | G06F 12/0897 | 711/119 |
| 8,688,900 | B2 * | 4/2014 | Eleftheriou | G06F 12/0246 | 711/103 |
| 8,769,202 | B1 * | 7/2014 | Soundararajan | G06F 12/0802 | 711/117 |
| 8,903,995 | B1 * | 12/2014 | Basak | H04L 43/08 | 709/224 |
| 8,949,531 | B2 * | 2/2015 | Uttamchandani | G06F 3/061 | 711/103 |
| 9,354,989 | B1 * | 5/2016 | Sehgal | G06F 11/00 | |
| 9,405,695 | B2 * | 8/2016 | Chang | G06F 12/0871 | |
| 2003/0065476 | A1 * | 4/2003 | Schmidt | G06F 17/17 | 702/179 |
| 2003/0126313 | A1 * | 7/2003 | Kerly | G06F 9/4843 | 719/331 |
| 2004/0205307 | A1 * | 10/2004 | Pullen | G06F 8/4442 | 711/158 |
| 2005/0108327 | A1 * | 5/2005 | Hama | G06F 17/30902 | 709/203 |
| 2006/0085597 | A1 * | 4/2006 | McNeill, Jr. | G06F 12/0866 | 711/118 |
| 2007/0143558 | A1 * | 6/2007 | Tseytin | G06F 11/3466 | 711/170 |
| 2007/0220455 | A1 * | 9/2007 | Joshi | G06F 17/5036 | 716/56 |
| 2008/0022049 | A1 * | 1/2008 | Hughes | G06F 12/084 | 711/130 |
| 2008/0027833 | A1 * | 1/2008 | Myers | G06Q 10/087 | 705/28 |
| 2008/0197842 | A1 * | 8/2008 | Lustig | G01R 33/561 | 324/307 |
| 2008/0244533 | A1 * | 10/2008 | Berg | G06F 11/3447 | 717/128 |
| 2009/0125465 | A1 * | 5/2009 | Berg | G06F 11/3616 | 706/17 |
| 2010/0017791 | A1 * | 1/2010 | Finkler | G06F 11/3409 | 717/158 |
| 2010/0042379 | A1 * | 2/2010 | Minnaar | G06F 17/5018 | 703/1 |
| 2012/0047287 | A1 * | 2/2012 | Chiu | G06F 3/0605 | 710/8 |
| 2012/0124318 | A1 * | 5/2012 | Bivens | G06F 11/3409 | 711/170 |
| 2014/0156910 | A1 * | 6/2014 | Uttamchandani | G06F 3/061 | 711/103 |
| 2015/0046653 | A1 * | 2/2015 | Soundararajan | G06F 12/0873 | 711/122 |
| 2016/0150003 | A1 * | 5/2016 | Magdon-Ismail | H04L 67/1097 | 709/223 |
| 2017/0177546 | A1 * | 6/2017 | Heinz | G06F 17/18 | |

OTHER PUBLICATIONS

The MathWorks, Inc., "What is the Genetic Algorithm?," Jun. 22, 2013, 2 pages. <https://web.archive.org/web/20130622194124/https://www.mathworks.com/help/gads/what-is-the-genetic-algorithm.html>.

* cited by examiner

Fig. 6A

Applications

Application

| VDI ▼ |

CPU data for this application
Total application IOPS: | 10000 | ◄►
Infer IO size and read fraction based on the application: ☐
Portion of IOPS that is reads: | Enter portion of IOPS that is reads |
Average read size (kB): | Enter average read size (kB) |
Average write size (kB): | Enter average write size (kB) |

Add application

Fig. 6B

Applications

Application

| VDI ▼ |

CPU data for this application
Total application IOPS: | 10000 |
Infer IO size and read fraction based on the application: ☑

Add application

| Array Type | Quantity ▲ | Expected CPU Util. Per Array (%) | 68% C.I. | Recommendation |
|---|---|---|---|---|
| CS200 Series | 1 | 162% | 154-170% | ⊗ |
| CS200 Series | 2 | 81% | 77-85% | ⊘ |
| CS200 Series | 3 | 54% | 51-57% | ⊘ |
| CS300 Series | 1 | 85% | 80-89% | ⊗ |
| CS300 Series | 2 | 42% | 40-45% | ⊘ |
| CS400 Series | 1 | 32% | 25-40% | ⊘ |
| CS500 Series | 1 | 22% | 21-24% | ⊘ |
| CS700 Series | 1 | 15% | 10-20% | ⊘ |

Fig. 8

All Arrays With >50% Of Data Classified (N = 230 arrays)

| Goal Quantile | 50% | 20% | 10% | 5% | 1% |
|---|---|---|---|---|---|
| Actual Quantile | 44.8% | 20.0% | 10.9% | 5.2% | 0.9% |
| 68% Confidence Interval for N Samples (+/-) | 3.2% | 2.6% | 2.1% | 1.5% | 0.6% |
| Actual Quantile within Confidence Interval? | FALSE | TRUE | TRUE | TRUE | TRUE |

Arrays With >50% Of Data Classified as Exchange (N = 27 arrays)

| Goal Quantile | 50% | 20% | 10% | 5% |
|---|---|---|---|---|
| Actual Quantile | 55.6% | 25.9% | 14.8% | 11.1% |
| 68% Confidence Interval for N Samples (+/-) | 9.7% | 8.6% | 7.0% | 6.2% |
| Actual Quantile within Confidence Interval? | TRUE | TRUE | TRUE | TRUE |

Arrays With >50% of Data Classified as VDI (N = 60 arrays)

| Goal Quantile | 50% | 20% | 10% | 5% |
|---|---|---|---|---|
| Actual Quantile | 43.3% | 20.0% | 10.0% | 3.3% |
| 68% Confidence Interval for N Samples (+/-) | 6.5% | 5.2% | 3.9% | 2.3% |
| Actual Quantile within Confidence Interval? | FALSE | TRUE | TRUE | TRUE |

Fig. 9A

Arrays With >50% Of Data Classified as Windows File Server (N=61 arrays)

| Goal Quantile | 50% | 20% | 10% | 5% |
|---|---|---|---|---|
| Actual Quantile | 47.5% | 23.0% | 14.8% | 3.3% |
| 68% Confidence Interval for N Samples (+/-) | 6.4% | 5.4% | 4.6% | 2.3% |
| Actual Quantile within Confidence Interval? | TRUE | TRUE | FALSE | TRUE |

Arrays With >50% Of Data Classified as Database (N=40 arrays)

| Goal Quantile | 50% | 20% | 10% | 5% |
|---|---|---|---|---|
| Actual Quantile | 47.5% | 15.0% | 7.5% | 2.5% |
| 68% Confidence Interval for N Samples (+/-) | 8.0% | 5.7% | 4.2% | 2.5% |
| Actual Quantile within Confidence Interval? | TRUE | TRUE | TRUE | TRUE |

Arrays With >50% Of Data Classified but <50% as any Specific Application (N=42 arrays)

| Goal Quantile | 50% | 20% | 10% | 5% |
|---|---|---|---|---|
| Actual Quantile | 40.5% | 16.7% | 7.1% | 7.1% |
| 68% Confidence Interval for N Samples (+/-) | 7.7% | 5.8% | 4.0% | 4.0% |
| Actual Quantile within Confidence Interval? | FALSE | TRUE | TRUE | TRUE |

Fig. 9B

METHODS AND SYSTEMS FOR DETERMINING HARDWARE SIZING FOR STORAGE ARRAY SYSTEMS

CLAIM OF PRIORITY

This application is a non-provisional of U.S. Provisional Patent Application No. 62/075,853, filed on Nov. 5, 2014, entitled "Methods and Systems for Determining Hardware Sizing for Storage Array Systems," which is herein incorporated by reference.

FIELD OF THE DISCLOSURE

The embodiments described in this disclosure relate to methods and systems that assist in determining sizing of resources to be used in a storage array based on predicted use metrics. In some configurations, sizing requirements are identified using a tool, that allows for accurate prediction of hardware resources needed by a storage array for specific use implementations.

BACKGROUND

Sizing hardware resources is an important function when storage arrays are selected for purchase by end users. Over sizing the hardware of a storage array can cause substantial waste of funds for a purchasing entity, especially if the entity is purchasing multiple storage arrays. Likewise, under sizing the hardware of a storage array can cause performance bottlenecks or failure to operate for the required application workloads.

SUMMARY

The methods, systems and tools disclosed herein accomplish a sizing assessment in a simple, systematic, and reliable way. The efficiency in which the sizing assessment is made provides significant value because it enables streamlining and acceleration of the provisioning process for storage arrays. The optimization provided by the sizing tools also minimize the risk of under sizing of the storage array, which could result in the need to provide purchasers with additional systems, free hardware, discounted hardware, simply to correct for incorrect sizing. In some embodiments, the tool is executed by a processor of a server. The server, in one configuration, is configured to provide interfaces to users that enable users to enter inputs needed to execute the sizing operations. At the server side, the server will have access to a database that stores metadata received from storage arrays. The metadata is for operational parameters produced when the storage arrays are in operation. The operational parameters further relate to applications served by the storage arrays over time and hardware configurations of the storage arrays that include sizes of SSD cache, sizes of the capacity and sizes of central processing unit (CPU), among other data points.

In one embodiment, a method includes sizing solid state drive (SSD) cache to be used in a storage array. The method provides access to a database that stores metadata received from storage arrays. The metadata from the database is analyzed to determine a distribution of working set sizes per amount of data utilized for applications used in the storage arrays. For each application, a best-fit linear model is produced, along with its corresponding distribution of residuals, to describe the distribution of working set sizes. The method then includes analyzing the metadata from the database to determine a distribution of read ratios for random input/outputs (I/Os) for each application. The method receives inputs for sizing SSD cache which identify applications to be used in the storage array, a volume of data to be used for each application, and a desired cache hit rate. The method then executes an iterative process for each application that repeats selecting a random offset value relative to the best-fit line of the distribution of working set sizes and selecting a random read ratio from the distribution of read ratios to produce a plurality of SSD cache sizes based on the iterative process. When sizing for multiple applications, one iteration of the above process is performed for each application and the SSD cache needs resulting from each are summed to determine one estimate of the SSD cache need for the array as a whole. This process is repeated many times, and an SSD cache size for the array is determined by finding the median of the produced plurality of SSD cache sizes. Methods for sizing CPU, which leverage the processed metadata are also provided.

In another embodiment, a method for sizing a cache of a storage array is disclosed. The method includes analyzing data from a plurality of storage arrays to determine application behavior parameters per application. The application behavior parameters include a distribution of working set sizes per amount of data utilized for each application. The method then includes receiving inputs for sizing the storage array. The inputs include one or more application types, volume of data for each application type, and a desired cache hit rate H. The method includes repeating a plurality of times, (i) picking one or more sizing parameters at random for each application type based on the application behavior parameters; (ii) calculating a cache size for each application based on the inputs, the one or more sizing parameters, and the application behavior parameters; and (iii) calculating a total cache size as a sum of all the calculated cache sizes for all the applications. The method then calculates an expected cache size as a median of the total cache size computed during the repeated plurality of times.

In still another embodiment, a method for sizing a central processing unit (CPU) of a storage array is disclosed. The method includes analyzing data from a plurality of storage arrays to determine application behavior parameters per application and per storage device type. Then, calculating a CPU usage normalized to Input/Outputs Per Second (IOPS) for each application and for each storage device type. The method then receives inputs for sizing the storage array, wherein the inputs include one or more of desired application types and desired IOPS. The method then repeats a plurality of times (i) picking a random value of normalized CPU for each average minutely IOPS, for each desired application type for storage device type; and (ii) calculating a cpu utilization value per application by multiplying the desired IOPS times the picked value of normalized CPU, and (iii) calculating a total cpu utilization value as a sum of the calculated cpu utilization values for all the application types. From the repeat times, obtaining a distribution of the total cpu utilization values. The method then includes calculating an aggregate CPU utilization required for the storage device type based on the distribution of the total cpu utilization values.

BRIEF DESCRIPTION OF THE DRAWINGS

FIGS. 6A and 6B illustrate example user interfaces that a storage array can render to an administrator user to determine sizing, based on known variables, in accordance with one implementation.

FIG. 8 provides an example display of the sizing tool for controller sizing output, in accordance with one implementation.

FIGS. 9A and 9B illustrate example cross-validation of the models used, in accordance with one implementation.

DETAILED DESCRIPTION

Figure 1A:
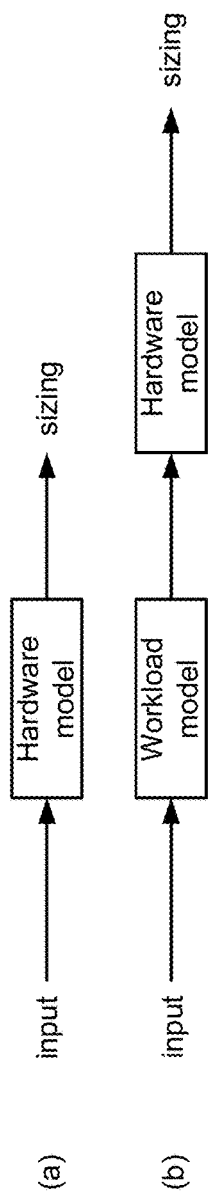
FIG. 1A illustrates examples of these sizing methods that may be used to size resources of a storage array, in accordance with one implementation.

The disclosed sizing tool and methodology use, in some configurations, an ensemble of continuously collected customer metadata from installed and operational storage arrays. The customer metadata is performance related data associated with use of one or more storage arrays. Examples of this metadata can include storage array model identifiers, CPU processing power, memory installed, size of flash storage, size of hard disk space, operational metrics, applications installed, hardware performance of particular applications with specific hardware configurations, and the like. However, this customer metadata does not include actual customer data stored on their storage arrays. In one embodiment, the customer metadata is collected over time, from the various installed systems (e.g., during normal operation use of the storage array).

The collection can occur in various ways. One way is for the storage array to communicate real-time data over the internet to a server of the storage monitoring system. Another way for the storage array to communicate data is by sending data periodically over the internet to a server of the storage monitoring system. If data is sent periodically, for example, the data can be collected for periods of time, e.g., daily, and then sent as a batch transfer. In one embodiment, the storage monitoring system can include one or more servers that define a cloud storage management service that provides support, updates and service to installed storage arrays. By way of example, the manufacturer of a storage array can provide the cloud storage management service for customers that have purchased storage arrays, thus adding enhanced dynamic support. In other embodiments, the cloud storage management service can be a standalone cloud service, which may provide storage management services for storage arrays of various manufacturers. More examples regarding uses of the cloud storage management service are discussed below with reference to FIG. 13.

Broadly speaking, the customer metadata, in one embodiment, is used to provide feedback to the customer regarding the operational efficiency of the storage array and to provide proactive recommendations to obtain better operation and/or performance.

In one embodiment, a sizing tool is disclosed to quantitatively characterize both the hardware's performance and the application workload behavior. In one implementation, the sizing tool is processed by a server, and users with accounts can access the server to obtain sizing information for desired storage arrays. The server, which may be part of a cloud system, can provide users with user interfaces for entering input data, which is used to provide sizing data based on the user's needs or intended needs. In some embodiments, the sizing data can be provided to customers wishing to upgrade storage arrays, purchase storage arrays, or fine tune the implementation of new resources. Generally, the collected customer metadata includes multiple levels of information, and is received from the storage arrays with minimal or no interruption. Further examples of metadata can include, without limitation, input/output (IO) statistics, which can be analyzed on a per-storage array basis and/or on a per-volume basis, along with metrics that define the current configuration data. In various embodiments, the power of this approach is four-fold.

First, the system avoids relying solely upon test/benchmark workloads in developing sizing logic. This is useful because the test and benchmark workloads which have canonically been used to develop sizing guidelines (e.g. IO meter and the Exchange ESRP test) are often infamously simplistic (e.g. ESRP data is ~35× compressible where customer data is almost always <5× compressible). By measuring customer workloads directly, day-in and day-out, the foundation of the sizing logic is based on measurements of a spectrum of real-world behavior rather than the biased picture presented by in-house experimentation. The measured customer workloads include not only the workloads of the customer that is receiving the sizing recommendation, but also workloads from other customers that have historically run similar workloads, similar applications, and have similar hardware configurations in an installed base. If the customer receiving the sizing data is a new customer attempting to size hardware for a new storage array, historical metadata of other customers is used to provide sizing recommendations based on desired target performance, applications to be run, and anticipated workloads. As used herein, an install base can include the many storage arrays that are operational in customer sites and are providing back metadata data.

Second, it is possible to quantify the uncertainty in predictive sizing models by leveraging the natural variation that exists from customer-to-customer and workload-to-workload within an installed base. As used herein, an install base refers to customers that have storage arrays in operation, and for which metadata is collected during said operation. Thus, once real customer metadata is used to develop a heuristic to size a new workload based on a set of known parameters, it is possible to reasonably estimate an expected deviation of a new workload from that prediction by measuring how far the distribution of observed customer workloads extends out from that predicted value. In some embodiments, not only can an amount and type of hardware be determined, but it is also possible to quantify an expected accuracy (e.g., with the assumption that new customer workloads will reasonably resemble those present among existing customers).

Third, by choosing larger or smaller sets of variables to be used as inputs by the sizing models, it is possible to allow the sizing tool to be flexible regarding the amount of information needed for sizing. In one embodiment, a user can get a preliminary sizing based on a very small amount of workload (with a large uncertainty range) and that user can get a more refined sizing by leveraging more specific workload data (and thus the tool prediction will have a correspondingly tighter uncertainty interval).

Fourth, by measuring (i) the input/output (TO) behavior of a workload as a function of the application and its configuration and (ii) the performance of the hardware based upon a particular IO profile, it is possible to bridge a gap between what a customer understands as their need from an application point of view and their needs from a hardware standpoint.

Overview of the Sizing Methodology

For each type of sizing (e.g. Cache, CPU, Capacity) there are two types of models: Hardware models that describe the operational requirements of the hardware as a function of the IO and working set requirements of an arbitrary workload; and workload models that describe the IO and working set characteristics of an application/workload as a function of its size and other application-specific parameters.

Given these models, a storage array (or set of storage arrays) can then be sized either (a) by directly describing the IO and working set characteristics needed by the workload to the hardware model (when known) or (b) by specifying application-level information to the appropriate workload model which will translate that information into the inputs required by the hardware model (while carrying forward the associated uncertainty).

FIG. 1A illustrates examples of these sizing methods. The input can be to (a) a hardware model that outputs a sizing, or (b) a workload model that then feeds a hardware model, to define the sizing. Examples of these models are described below, with reference to sizing storage array cache and storage array CPU. In one embodiment, use of the term "cache," in regard to "cache sizing," refers to solid state drive (SSD) storage that is used as a "read cache" in a hybrid storage system. In hybrid storage systems, hard disk drives (HDDs) represent main storage, while SSDs functionally serve as the read cache to accelerate system performance. More example details regarding hybrid storage systems are provided with reference to FIGS. 10 and 11.

Cache Hardware Model

In one embodiment, a Cache Hardware Model is disclosed. One element in cache sizing is finding a good estimate of the non-sequential working set size for a given set of data. With that piece of information (along with the fraction of non-sequential IO that is read vs. written), a model of FIFO cache operation is developed that allows calculation of the amount of cache required to support a desired hit rate. In one embodiment, for some storage arrays, reasonable hit rates are around 80% and strong hit rates are around 90% or more.

In one embodiment, using this model in reverse, it is possible to quantify the non-sequential working set size for an existing workload when it has been measured (i) the fraction of its non-sequential IO that is read vs. written, (ii) the amount of cache it has access to and (iii) the hit rate it achieves on that cache size.

CPU Hardware Model

In another embodiment, a CPU Hardware Model is disclosed. Distinct controller types (e.g. for different storage array models) have different capabilities in terms of the amount of iSCSI or Fibre Channel IO they are capable of serving. The amount of IO that each of these controllers can support will vary as a function of the IO size, the fraction of IO that is reads vs. writes and the portions of reads and writes that are sequential vs. random. In order to quantify the real-world capabilities of these arrays (where the arrays are performing standard background processes including, for example, disk and flash garbage collection, replication, snapshot creation in addition to their user-generated IO), an embodiment quantifies average CPU Utilization (%) reported (per minute) as a function of the iSCSI/Fibre Channel IO happening on the array during that minute.

In one embodiment, a simpler version of this model, CPU Model A, does not explicitly require that sequential vs. non-sequential IOs be separated. This model is useful because some users, if they want to plug information into the CPU sizing model directly, may not know the sequential vs. non-sequential breakdown of their IO, and yet still need a viable estimate of the CPU need. By fitting a simpler model to the observed install base data, the typical sequential vs. non-sequential breakdown of reads and writes of different sizes can be implicitly assumed. Additionally, deviations from those typical values are accounted for in prediction confidence intervals.

By way of example, in one model, cpu is the dependent variable which represents the expected CPU Utilization (%); ro, wo, rt, and wt represent the average number of read operations per second, the average number of write operations per second, the average amount of read throughput per second, and the average amount of write throughput per second respectively, while $c_{ro}$, $c_{wo}$, $c_{rt}$, and $c_{wt}$ represent the fit coefficients for read operations per second, write operations per second, read throughput per second, and write throughput per second, respectively.

In one embodiment, the values of those coefficients can be established by linear least-squares fitting to a set of array minutes taken from arrays with the same controller type. An array minute refers to the data captured on one minute for one array. Array minutes with low cache hit (e.g. less than 80%) and excessive memory hit (e.g., more than 30%) may be filtered to prevent biasing the model's predictions towards scenarios with either very small workloads (that fit in memory) or where the cache is undersized.

In one embodiment, utilizing Model A, cpu is calculated with the following equation:

$$cpu = (c_{ro} \cdot ro + c_{wo} \cdot wo + c_{rt} \cdot rt + c_{wt} \cdot wt)$$

In another embodiment, a more sophisticated version of this model, CPU Model B, requires that the IOs be broken down into sequential and non-sequential categories. Therefore, Model B has better predictive power (e.g., in that, with enough data supporting to fit the confidence interval for CPU Utilization (%) will be smaller), but it requires more information in order to obtain the better prediction.

As before, cpu is the dependent variable which represents the expected CPU utilization (%). Regarding sequential IOs, sro is the average number of sequential read operations per second, swo is the average number of sequential write operations per second, srt is the average amount of sequential read throughput per second, and swt is the average amount of sequential write throughput per second.

Further, $c_{sro}$, $c_{swo}$, $c_{srt}$, and $c_{swt}$ represent the fit coefficients for sequential read operations, sequential write operations, sequential read throughput, and sequential write throughput respectively.

Regarding non-sequential IOs, nsro is the average number of non-sequential read operations per second, nswo is the average number of non-sequential write operations per second, nsrt is the average amount of non-sequential read throughput per second, and nswt is the average amount of non-sequential write throughput per second. Fit coefficients $c_{nsro}$, $c_{nswo}$, $c_{nsrt}$, and $c_{nswt}$ represent the fit coefficients for non-sequential read operations, non-sequential write operations, non-sequential read throughput and non-sequential write throughput respectively.

As with CPU Model A, in one embodiment, the values of these coefficients for Model B can be established by robust linear least-squares fitting to a set of array minutes taken from arrays with the same controller type. In one embodiment, the same controller type refers to a controller of a storage array, which has a particular hardware configuration, e.g., CPU size, memory size, flash (i.e., cache) size, disk size, etc.

In one embodiment, utilizing Model B, cpu is calculated with the following equation:

$$cpu = (c_{sro} \cdot sro + c_{swo} \cdot swo + c_{srt} \cdot srt + c_{swt} \cdot swt) + (c_{nsro} \cdot nsro + c_{nswo} \cdot nswo + c_{nsrt} \cdot nsrt + c_{nswt} \cdot nswt)$$

Figure 1B:
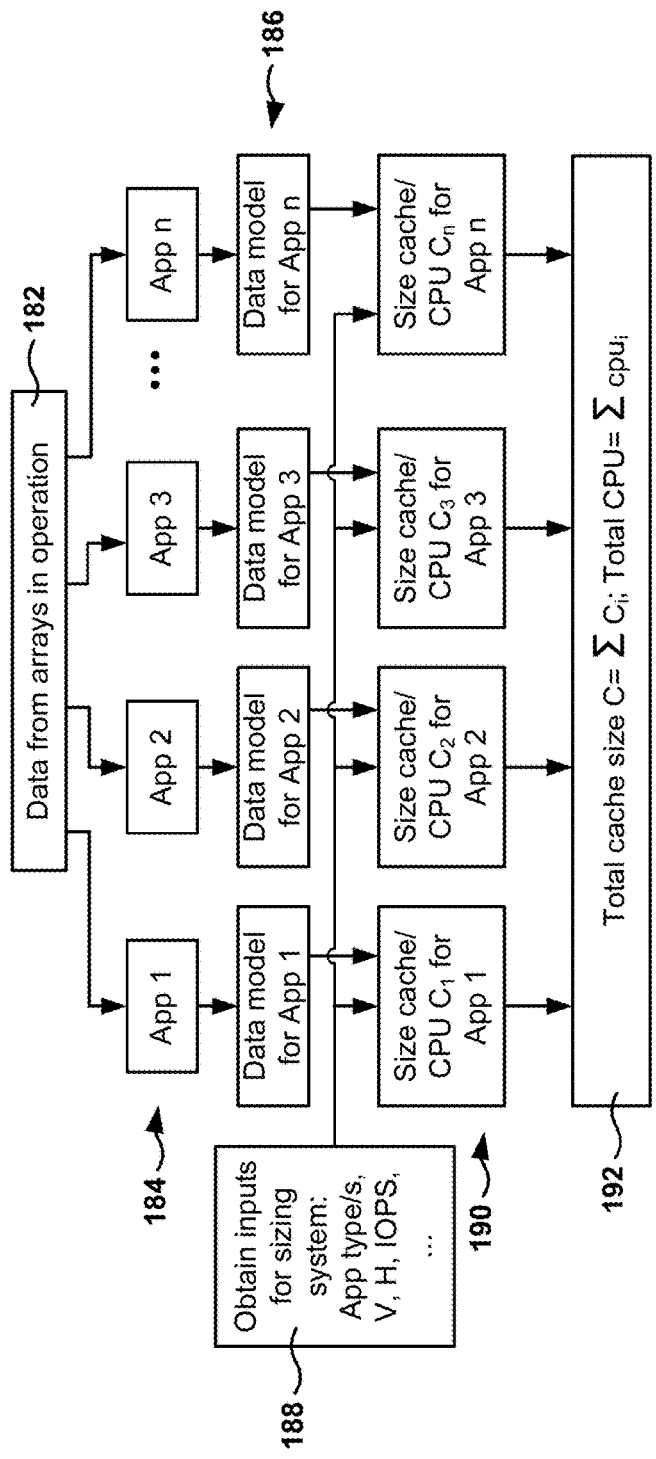
FIG. 1B is a diagram showing example hardware sizing calculated for a particular storage array configurations, in accordance with one implementation.

FIG. 1B is a diagram detailing how hardware requirements are calculated for a particular customer configuration, according to one embodiment. In one embodiment, data is collected 182 from arrays operating in existing working environments, where the data includes type of application in use, the amount of space being used by each application, the hardware model, the size of the different hardware elements, statistics of performance, etc. This data may be stored by the cloud storage management system in databased, representing metadata received over time from the various storage arrays in operation or arrays that have been in operation in the past.

After the data is collected, the data is classified according to application 184 (e.g., App 1, App 2, etc.), and then the data model is applied 186 per application type of obtain statistical parameters characterizing the behavior of the storage array for each type of application.

In operation 188, the inputs to size a particular system are obtained from the system administrator, where these inputs include one or more of application type, amount of data reserved or expected for the application (V), desired hit rate (H), desired Input/Output operations Per Second (IOPS). In other embodiments, additional input parameters may be utilized.

After the characteristics of the system to be sized are obtained, the cache and/or CPU required for each application are calculated 190 based on the statistical parameters previously determined for each type of application and the inputs obtained. Finally, the total cache, CPU and/or capacity required are obtained by adding the requirements for each of the applications configured. Additionally, a confidence level is also provided regarding the calculated requirements.

Figure 2B:
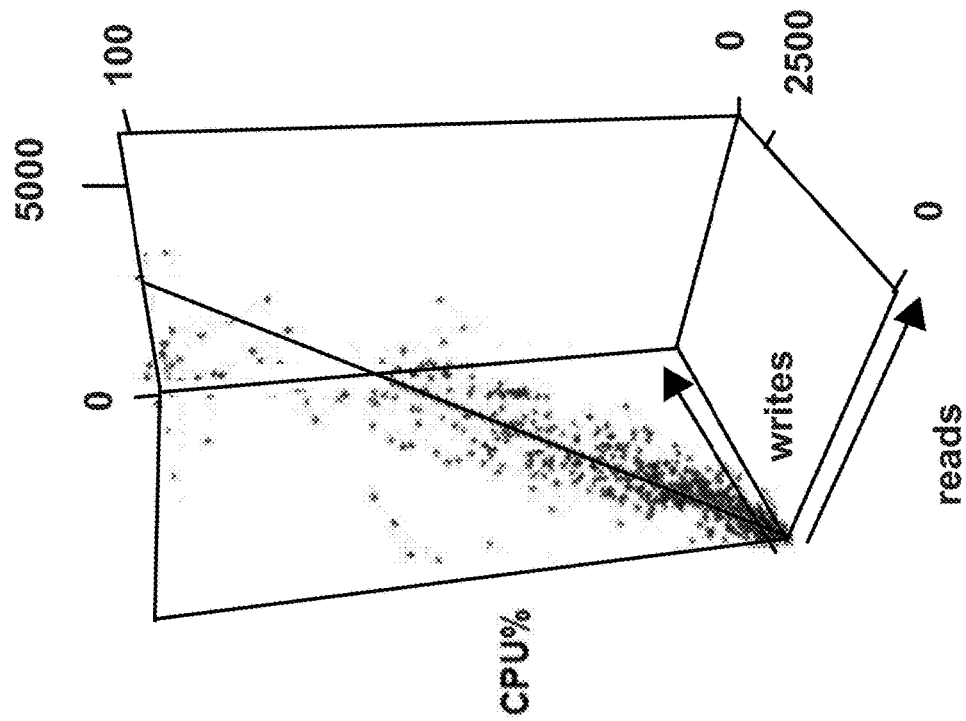
FIGS. 2A and 2B illustrate an example linear model of CPU Utilization for a particular storage array, as a function of the number of reads and writes.
Figure 2A:
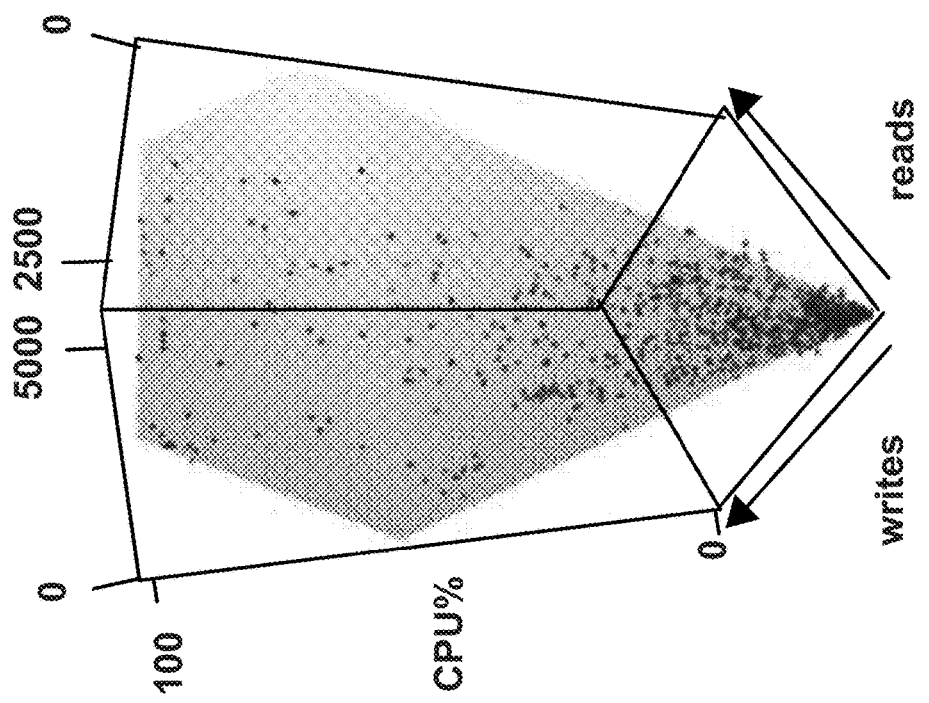

FIGS. 2A and 2B illustrate an example linear model of CPU Utilization (%) for a particular storage array, as a function of the number of reads and writes (read and writes of average size 32+/−2 kB). The plane (left illustration of FIG. 2A) and the cross-section of that plane shown as a line (right illustration of FIG. 2B) represent the linear fit while individual black points represent array-minutes.

By creating CPU models for each of the different controller types (i.e., controllers of a storage array), it is possible to determine for a given minutely IO pattern what the expected CPU Utilization will be. If that number is over 100% then we know that more than one storage array with that controller type will be necessary to properly support the described workload. Examples of the results used for recommendations regarding sizing are shown in FIG. 8. It should be noted that this example is only for CPU, but other graphical user interfaces, data sets, tables, or information can be represented for CPU and cache sizing.

Workload Models (Application Models)

In order to leverage customer metadata to build workload models, one operation includes identifying sets of volumes and time periods corresponding to the type of workloads that customers will be sizing for. The criteria for selecting these volumes and time intervals can differ depending upon what is being sized.

Cache Sizing: Data Filtering Criteria

To understand what factors determine the size of the working set, a subset of the volumes in an install base that would represent active customer workloads at quasi-steady-state is identified. To accomplish this, data is aggregated over weekly time intervals (or some other time interval) (e.g., to consolidate the effects of weekly cron jobs), and volumes are filtered out from the working sample using the following example criterion.

The volume may contain at least 10 GB of data on average over the week in question. In one embodiment, this ensures a sufficient dataset size for a meaningful measurement.

The volume usage may not change more than 5% during the week in question. In one embodiment, this ensures the volume is not undergoing some change that would not represent a quasi-steady-state workload.

The volume may be at least 100 days old at the beginning of the week. In one embodiment, this ensures the volume has had time to equilibrate since creation.

The volume may contribute at least 0.1% to the overall cache flux for the week. In one embodiment, this ensures the volume is being actively used. The precise cache flux cutoff can be varied for particular applications to correct for any discrepancies between the model and subsequent cross-checks.

The volume may not have an average hit rate H of more than 0.99 for the week. In one embodiment, volumes with hit rates larger than 0.99 have working set sizes that are difficult to quantify accurately since when R approaches 0 (e.g., R is the fraction of non-sequential IOs that are reads), the amount of cache needed to support a finite working set diverges as H approaches 1 (e.g., H is also known as the fraction of reads that are to be served from cache).

The volume may not be described as a log volume, a test volume or a temporary volume. In one embodiment, these volumes may not represent typical active workloads. Regex expressions are applied to the volume name, description, and other similar fields to determine if there are any indicators that a volume would fall into these categories. Again, these criteria are just examples, and variations in the assumptions may be made, and in some cases, not all of the criterions are needed or used.

CPU Sizing: Data Filtering Criteria

As with cache sizing, it is desirable to identify those volumes exhibiting TO profiles that are representative of their application. As with cache sizing, we remove from our sampling data volumes exhibiting signs that they may not be representative of workloads a customer would be sizing for.

The volume may contain at least 10 GB of data on average over the week in question. In one embodiment, this ensures a sufficient dataset size for a meaningful measurement.

The volume may be at least 100 days old for the identified array-minutes. In one embodiment, this ensures the volume has had time to equilibrate since creation.

The volume may have an average cache hit rate of more than about 0.8 for the identified array-minutes. In one embodiment, volumes with lower cache hits are undersized for cache and perform less well.

The volume may have an average memory hit rate of less than 0.3 for the identified array-minutes. In one embodiment, volumes with higher memory hit rates are artificially small and will perform unrealistically well.

These criterion are just examples, and variations in the assumptions may be made and in some cases, not all of the criterions are needed or used.

Identifying Volumes in the Install Base Running Particular Applications:

Having identified array-weeks and array-minutes to those having workloads at steady-state, it is now possible to characterize which applications are running on which volumes. In one embodiment, a two-pronged approach was used:

First, we performed regex (i.e., regular expression) testing on various text fields which describe individual volumes including customer entered fields such as "Volume Name", "Volume Description", "VolCollection Name", "VolCollection AppID", and "PerfPolicy Name". This testing was designed to classify a volume into one of eight workload categories which represent an example install base: "Exchange", "VDI", "Windows File Server", "SQL Server", "Sharepoint", "Oracle", "Other Database" and "Unclassified". The "Other Database" category includes databases that do not have significant representation in the install base on their own (e.g. Postgres, DB2, etc.). The "Unclassified" category contains volumes that do not clearly indicate their belonging to one of the other categories (but because we are filtering strictly and a small fraction of volumes are clearly labeled, this category will likely contain members that would, if labeled, belong to the other seven).

Second, a survey of customers was made to allow them to manually annotate individual volumes in accordance with the categories above. This survey data was used to cross-validate the regex classifier to ensure that the vast majority (>95% for Exchange, VDI, SQL Server, and Windows File Server) of volumes classified did indeed belong in their regex-identified category. It should be understood that the types of applications identified in the example implementation represent applications that are often used today, and it is envisioned that in the future other types of applications will be possible, and in some cases, the example applications may be replaced with completely different example applications. This being said, the example application types mentioned in this disclosure are just that, examples.

Workload Models for Cache Sizing: Estimating the Non-Sequential Working Set Size Now that we have a set of curated volumes with labeled applications, we can begin quantifying the behavior of those workloads in order to develop a general model of their cache needs.

Cache Sizing: Leveraging an Array Caching System to Estimate the Non-Sequential Working Set Size.

The size of a workload's random working set is one determinant factor of how much cache that workload will require. In one configuration, to estimate the size of the random working set for a particular volume, a model of FIFO cache operation was used, but the same principles presented herein may be utilized with other cache eviction schemes.

This model includes three workload variables: (1) the cache hit rate 'H' (a number between 0 and 1 indicating the fraction of reads that are read from cache rather than disk), (2) the read ratio 'R' (a number between 0 and 1 indicating the fraction of total IO that are reads rather than writes) and (3) the ratio of the amount cache available to the size of the random working set 'S' (e.g. S=½ if the cache available is ½ of the random working set size and S=2 if the cache available is twice the size of the random working set). In one embodiment, S is a function of H and R and is calculated with the following equation:

$$S = \left(\frac{1-HR}{1-R}\right)\ln\left(\frac{1-H}{1-HR}\right)$$

In one embodiment, using metadata collected from installed storage arrays, it is possible to identify the hit rate 'H' and read ratio 'R' for each volume individually. It is also known the total amount of cache available to the array (referred to herein as 'C'). Because of the FIFO nature of the cache, we know that the proportion of the array's cache used by a given volume should be reasonably approximated (at quasi-steady-state) by the proportion of data that each volume submits to the cache (i.e. the cache flux 'F'=writes+ missed reads). Thus the relationship between C and F is as follows:

$$\frac{C_i}{C_{total}} = \frac{F_i}{\sum_{j=1}^{n} F_j}$$

Where $C_i$ is the amount of cache available to the ith volume, $C_{total}$ is the amount of cache available to all of the volumes on the array and the sum over j (from 1 to n) runs over all volumes in the array that share access to the common pool of cache 'C'. $F_i$ is the cache flux for the ith volume.

Knowing C, H, and R enables use of a model to calculate the size of the random working set 'B' for an individual volume as shown below:

$$B_i = S_i \cdot C_i$$

Now it is possible to calculate the random working set for an individual volume, and the representative subset of volumes (for each application) are selected to build the sizing tool's sampling distributions.

Cache Sizing: The Working Set Size as a Function of the Amount of Data

Now that we have (i) categorized volumes by application, (ii) identified volumes that should support active customer workloads, and (iii) determined how to measure the working set for these volumes, we can begin building a general model that tries to predict the non-sequential working set size for a volume given. For example, the size of its data footprint on disk may be determined. This is a good candidate independent variable for our workload model since the working set size (in MB) is likely to depend strongly on the total amount of data supporting the workload.

Figure 3:
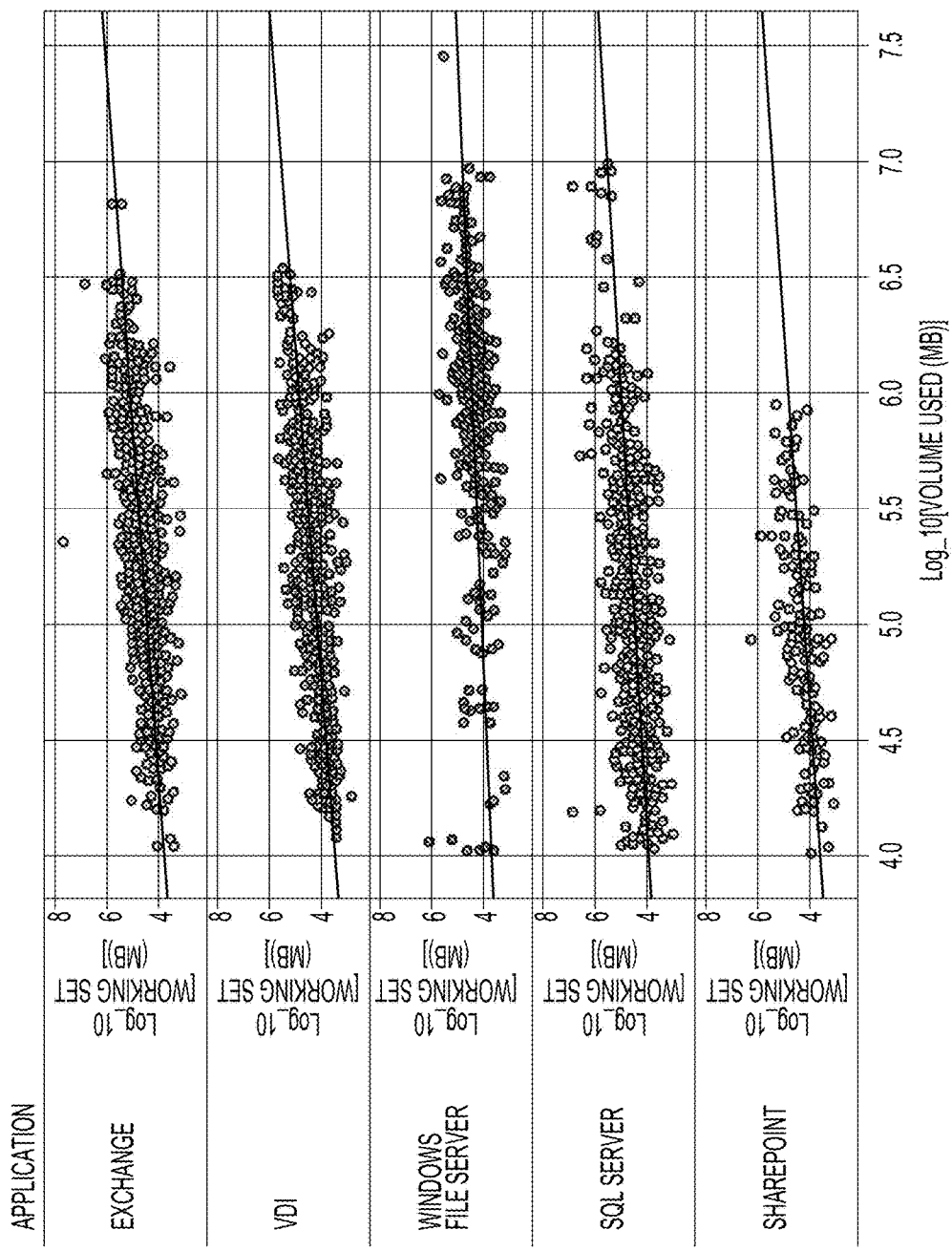
FIG. 3 provides an illustration of distributions of working set sizes for individual volumes, as a function of the amount of data stored in each of the volumes, and a best-fit line for each application type having a respective slope (m), in accordance with one implementation.

FIG. 3 provides an illustration of the distribution of the working set size for individual volumes, as a function of the amount of data stored on the volume. As shown, various example applications are shown along the vertical axis, such as Exchange, VDI, Windows File Server, SQL Server, and Sharepoint. For each application, the vertical axis provides the $Log_{10}$[Working Set (MB)]. In the horizontal axis, the $Log_{10}$[Volume Used (MB)], identifies the amount of data stored V on the respective volume.

One embodiment of this disclosure defines an application-specific model to extrapolate from real-world workload data. For a given week, each point represents a distinct volume having a size, and the plot shows six weeks of overlying data. Volumes are classified by application as described above. Plotting the amount of data stored on a volume versus the estimated working set size for that volume shows that the size of the working set for a volume increases predictably with the amount of volume used. Additionally, the rate of that increase differs from application to application (e.g. the working set for an Exchange or VDI workload increases faster with increasing volume size than does a Windows File Server workload).

Interestingly, the increase in the working set size B as a function of volume used is less than proportional for all observed application categories. As an example, the least-squares fit for the Exchange deployments give a best-fit line defined as $B=0.995 \cdot V^{0.668 \, (m)}$ where 'B' is the working set size (in MB) and 'V' is the volume (i.e., data) used (in MB). As shown in FIG. 3, "m" is the slope of the best-fit line, where each application will have a different "m." In one embodiment, the relationships are alternatively fit by a power function (with the exponent less than 1) rather than a linear function by examining a plot of the Residuals vs. Fitted Values, the Normal Quantile-Quantile plot and the Scale-Location plot.

Having identified this fundamental trend for how the size of the non-sequential working set varies as a function of each application, it is now possible to use that model to predict the working set size for new workloads. In one embodiment, in order to take into account the natural variance of the working set size, we can calculate the deviation of each array-week from the modeled value using the following equation:

$$\frac{B_i}{V^m} = O_i$$

Where B is the working set size for the specific workload in question 'i', V is the amount of capacity occupied by the workload, m is the power (between zero and one) obtained by fitting the ensemble of workloads in the same application type in log space (as in FIG. 3), and O is the offset of that specific workload from the model prediction, which is a best-fit line. Specifically, with reference to FIG. 3, each point represents a volume having an amount of data, and for each point, there is a residual, or offset O from the best fit linear model (in this case, a line). The distribution of these offsets is used to assess the uncertainty of the caching calculation when a new workload is being sized. That is, we make use of the deviation from the model's best-fit line to quantify the uncertainty in our predictions. More details on how the cache is sized are provided below with reference to FIG. 5D.

Figure 4:
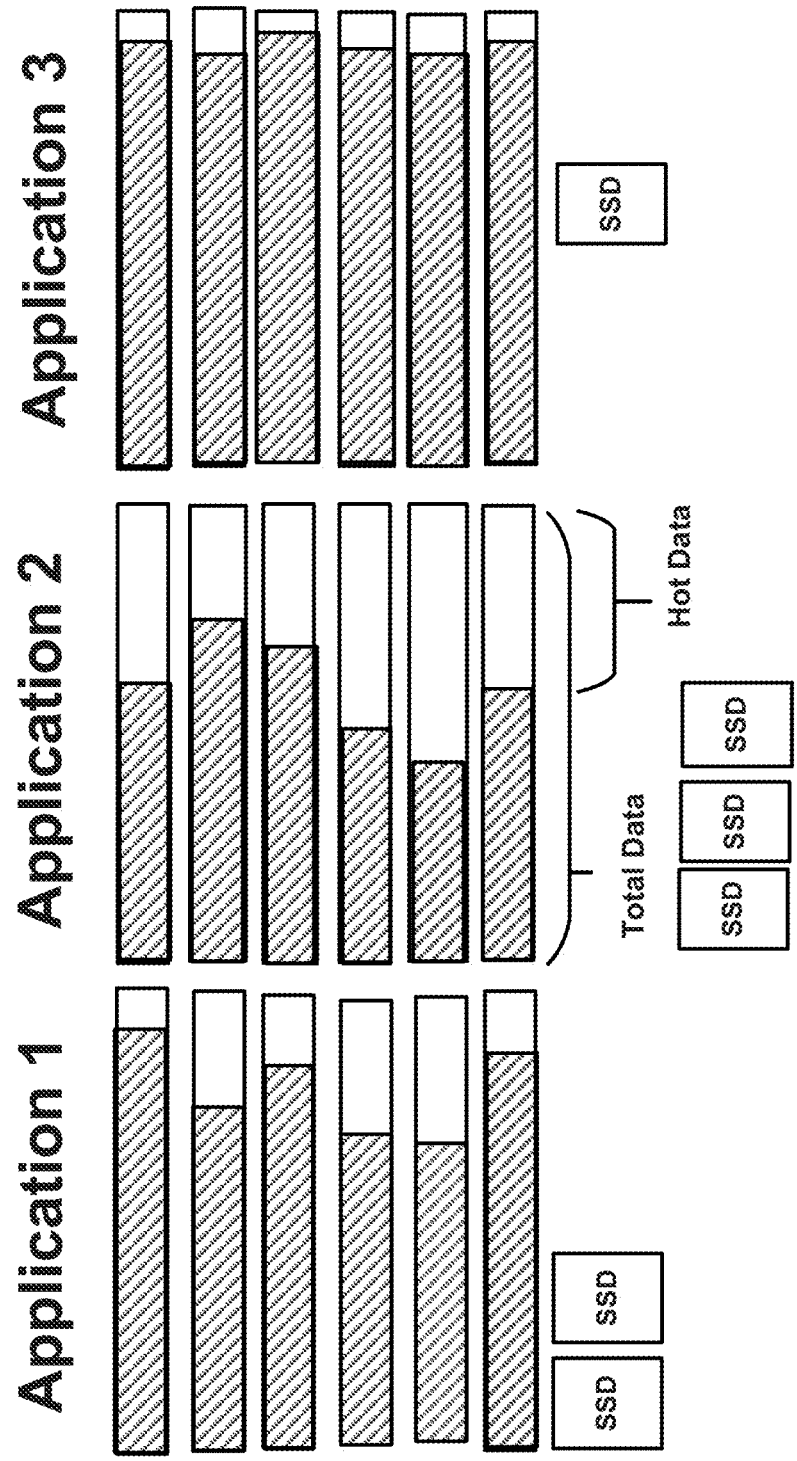
FIG. 4 illustrates applications having distinct working set sizes, in accordance with one example.

FIG. 4 illustrates applications having distinct working set sizes. The working set, i.e., the amount of "hot data" is a significant determinant of cache needed. Some applications actively reference a bigger proportion of their data than others. For example, distinct instances of Application 2 run by different customers, access more hot data in general than Application 1 or Application 3 (despite customer-to-customer variation) as shown by the darker hatch in the bar graphs. FIG. 4 also shows three SSDs for Application 2, two SSDs for Application 1, and one SSD for Application 3, for purposes of showing the relative additional need for SSD cache, based on the amount of hot data used by the respective applications.

Figure 5A:
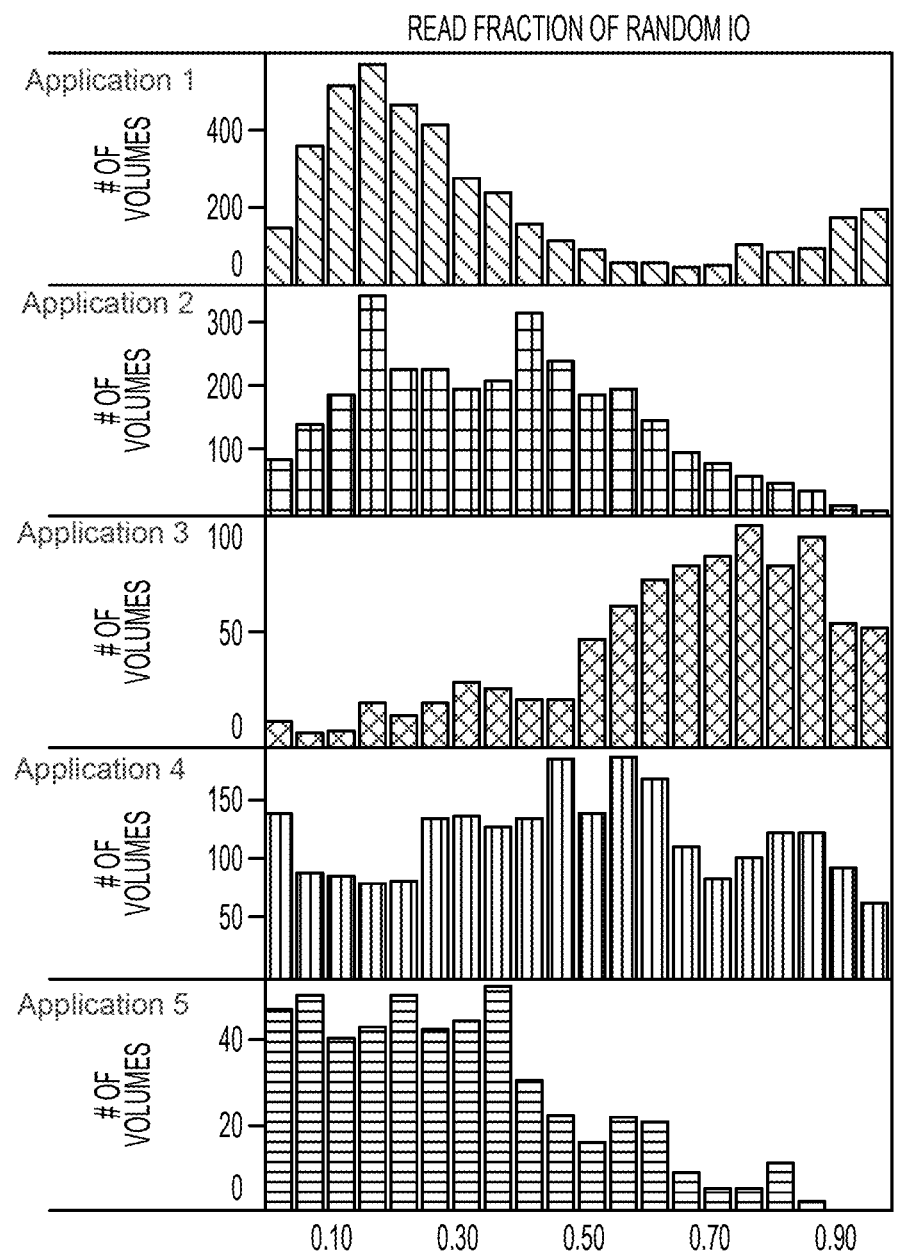
FIG. 5A show histograms describing the distribution of R, which is the fraction of random IOs that are reads, in accordance with one example.

FIG. 5A show histograms describing the distribution of R, which is the fraction of random IOs that are reads. The horizontal axis is for R and it ranges from 0 to 1, and the vertical axis represents the number of volumes that fall within each of the histogram bars. As it can be observed, some applications have as much smaller percentage of IOs that are reads (top chart), while others have a much higher percentage of read IOs (e.g., third chart). From top to bottom, each row represents one of the applications identified in FIG. 3. The top is, for example, an Exchange application, the second down is a VDI application, the third one down is a Windows File Server application, the fourth one down is an SQL Server, and the bottom one is a Sharepoint application.

While constructing the sampling distributions for the working set size required an understanding of how the working set size depended on the amount of data stored in the volume (see above), the read fraction and data compression rates were simply sampled across the set of volumes for each application category. The sampling is illustrated by the bar graphs of FIGS. 5A and 5B.

Figure 5B:
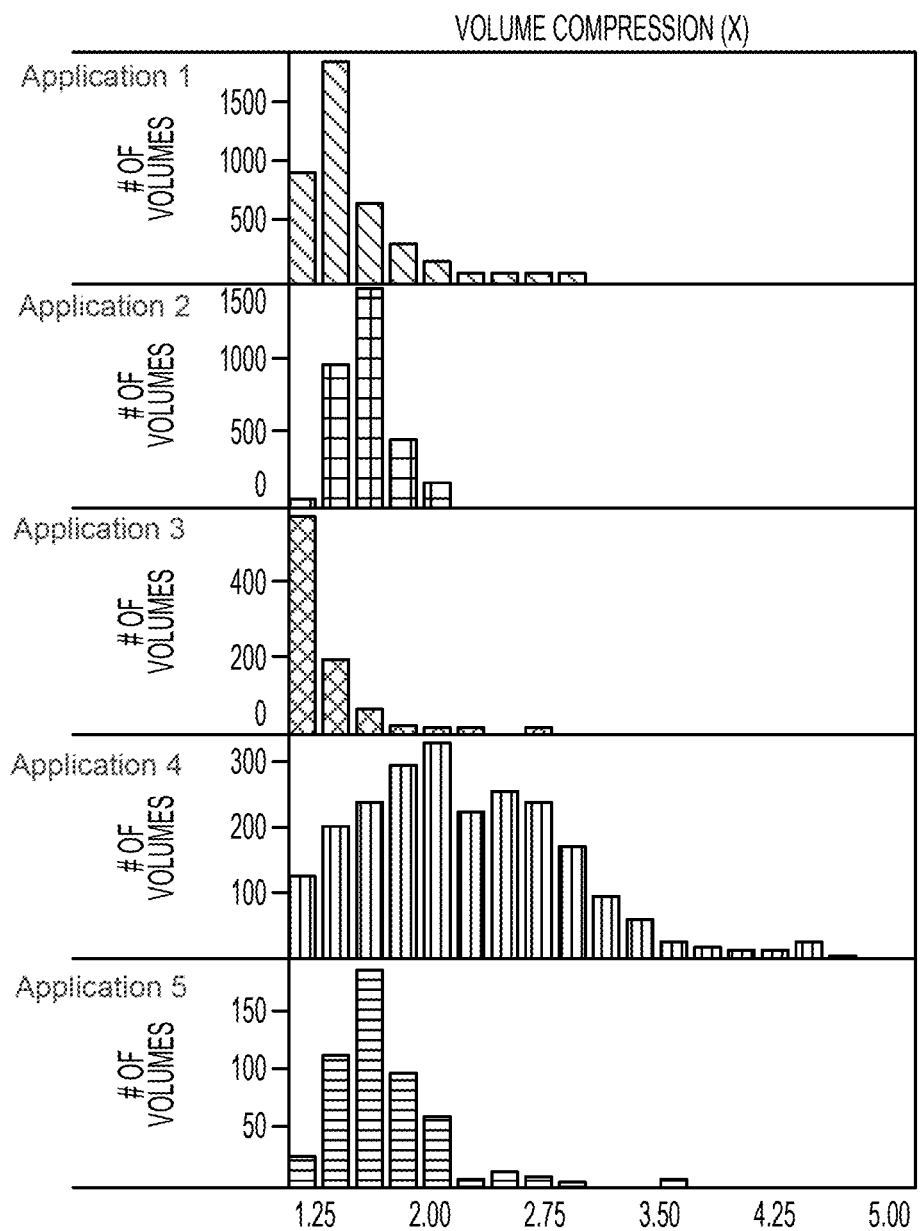
FIG. 5B shows volume compression factor (X) that is the compression ratio of data stored in storage arrays, in accordance with one example.

In FIG. 5B, the horizontal axis represents the volume compression factor (X) which illustrates the compression ratio of data stored in the array. For example, a compression ratio of two means that a certain amount of data only takes half the space in storage. The vertical axis represents the number of volumes falling into the buckets defined for each of the histogram bars. It can be observed that some applications have higher compression rates than others, such as the application corresponding to the fourth chart were compression rates are much higher than in the first chart.

In one embodiment, an amount of compressed data stored by an application V' is defined as V times the compression factor X. Therefore:

$$V' = V \times X$$

Figure 5C:
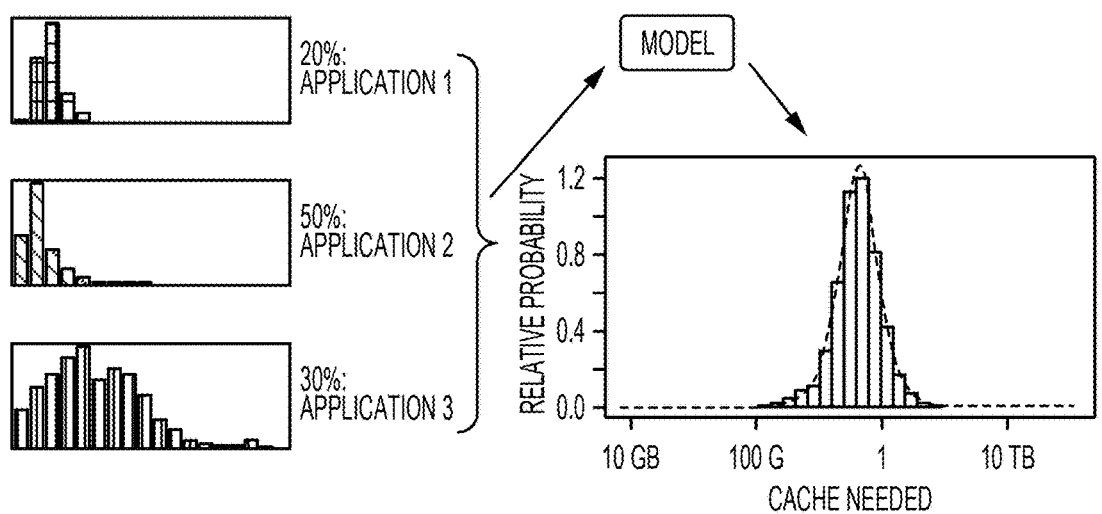
FIG. 5C illustrates that the sizing of the cache needed for an array hosting several applications can be determined by convolving the cache needs distributions from individual applications, in accordance with one implementation.

FIG. 5C illustrates how individual sizings for individual applications can be combined into a sizing for an array hosting multiple applications at once. By way of example, application 1 needs 20% of the storage by capacity, application 2 needs 50% of the storage by capacity, and application 3 needs 30% of the storage by capacity. The sizing of the amount of cache needed for the combination of these applications and the expected distribution of the cache needed for that combination is calculated by performing a convolution of the three individual distributions. In one embodiment, this is accomplished by (1) taking a random sample cache size needed from each application's distribution, (2) summing the result to get a sample combined cache size (3) repeating 1 & 2 a large number of times to construct a distribution of combined cache size, and (4) determining percentiles, including the median for the expected combined cache size needed. Using the heuristic described above an amount of cache needed is identified, based on a relative probability. In this case, the expected need is calculated as a prediction that yields just below 1 terabyte (1 TB), with an amount of uncertainty defined by the outer edges of the histogram.

Figure 5D:
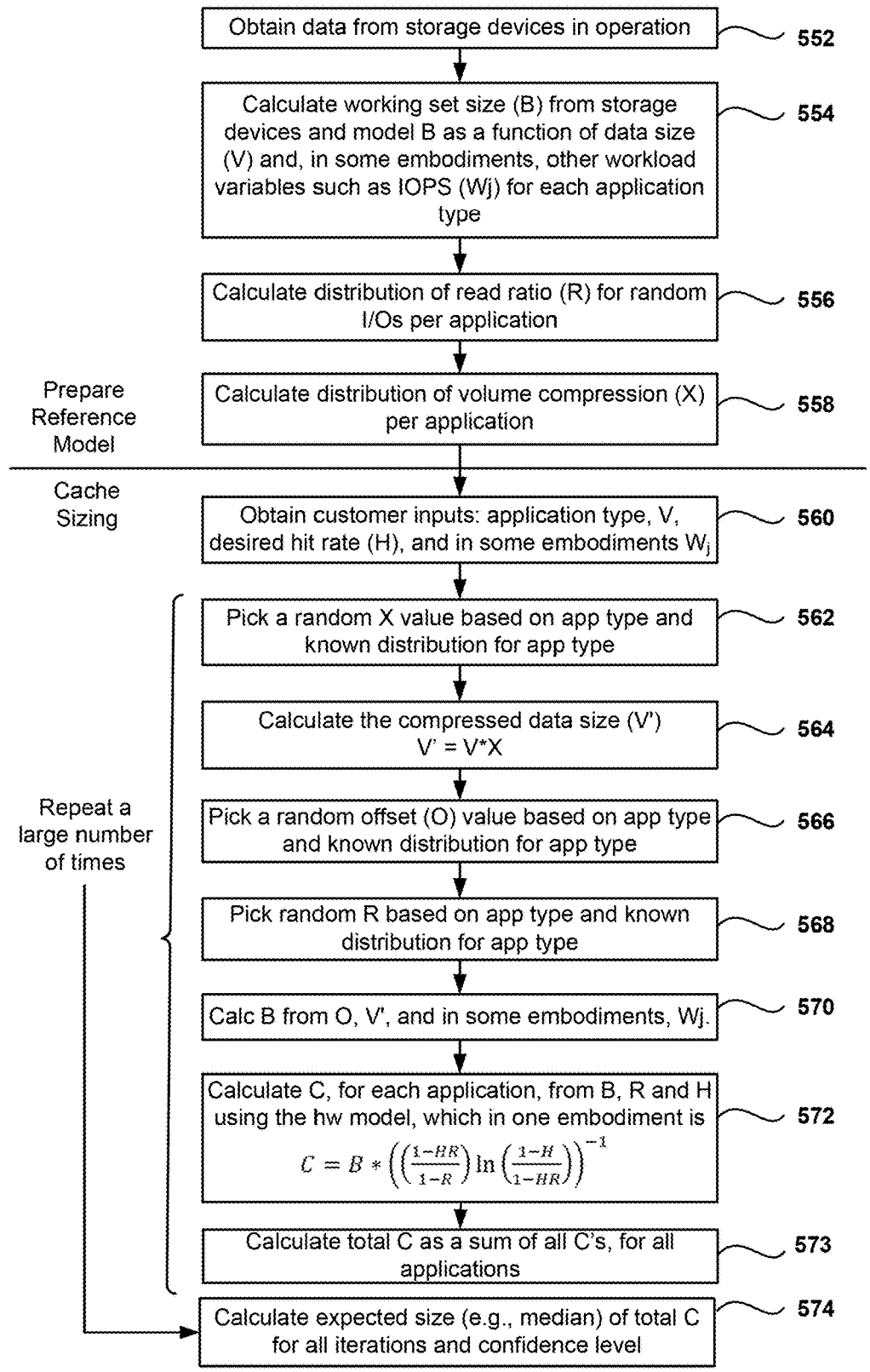
FIG. 5D is a flowchart of a method for calculating the size of cache required for a specific storage array, according to one embodiment

FIG. 5D is a flowchart of a method for calculating the size of cache required for a specific storage array, according to one embodiment. At a high level and by way of example, the cache sizing tool works by referencing the distribution of working set sizes (B) and the distribution of read ratios (R) found in the install base for each category of application workload. To make an estimate of the amount of cache needed by a hypothetical storage array, the sizing tool runs through the process defined in FIG. 5D.

The top of the chart, operations 552, 554, 556, and 558, refer to the operations for preparing the reference model. As discussed above, data from operating systems is collected and analyzed to identify behaviors of the different applications. The bottom part of the chart, operations 560-572, refers to the sizing of the cache for a particular set of requirements.

Therefore, in operation 552, data is obtained from the storage devices that are currently in operation. Data from devices that are not in current operation, but nevertheless produced data that was collected, can also be used. In one embodiment, the data is filtered according to a set of criteria, as described above. From operation 552, the method flows to operation 554 where the working set size (B) is calculated in the model as a function of the data size V (e.g., see FIG. 3). In some embodiments, other independent variables may also be considered when modeling the working set size, such as the number of IOPS (W) for each of the applications. Once a model for B is determined, the distribution of the residuals for the data points used to generate the model is maintained as the offset distribution (O).

From operation 554, the method flows to operation 556 where the distribution of the read ratio R is calculated for random I/Os and per application (e.g., see FIG. 5A). From operation 556, the method flows to operation 558 to calculate the distribution of volume compression X per application (e.g., see FIG. 5B). At this point, the reference model is complete and the sizing tool is available to receive inputs for sizing the cache of a particular system.

In operation 560, input is obtained from a customer (e.g., system administrator) that identifies the desired performance and, as an example, the expected uncompressed application footprint on disk. In one embodiment, the customer may be one preparing to purchase a new storage array, one that just purchased a new storage array, one that needs to upgrade to a new storage array (e.g., scale-up), or one that needs to expand performance (e.g., scale-out), one wanting to understand what other applications may fit on an existing array, or any combination thereof. In one embodiment, the sizing tool obtains the application type or types that will store data in the storage array, the expected volume size V, and a desired cache hit rate H. In some embodiments, other independent variables, such as the expected number of IOPS $W_j$ are also received as an input.

From operation 560, the method flows to operation 562, where a random compression rate X is selected based on the application type and the known distribution of compression rates for that application type (e.g., see FIG. 5B). In operation 564, the compressed data size V' is calculated as V'=V×X.

Further, in operation 566, a random offset O value is selected at random based on the application type and the known distribution for of offsets for that application type. For example, as seen in FIG. 3, for a given application type in a volume size V (horizontal axis), the distribution of the different offsets with reference to the best-fitted line is taken as a guide for selecting the random offset O.

From operation 566, the method flows to operation 568, where a random read ratio R is picked based on the application type and known distribution for the application type (e.g., see FIG. 5A).

From operation 568, the method flows to operation 570 where the size of the working set B is calculated based on O and V' and, in some embodiments, other independent variables. In one embodiment, B is calculated according to the following equation, where "m" is the slope of the best-fit line for B.

$$B = O*(V')^m$$

In some embodiments, B is also a function of $W_j$ (e.g., IOPS).

From operation 570, the method flows to operation 572 to calculate the required cache size. In one embodiment, C is calculated for each application according to the following equation:

$$C = \frac{B}{S} = \frac{B}{\left(\frac{1-HR}{1-R}\right)\ln\left(\frac{1-H}{1-HR}\right)} = B*\left(\left(\frac{1-HR}{1-R}\right)\ln\left(\frac{1-H}{1-HR}\right)\right)^{-1}$$

In operation 573, a total C is calculated as a sum of all C's for all applications. Operations 562, 564, 566, 568, 570, 572 and 573 are repeated.

In one embodiment, the repeating occurs a large number of times to calculate respective cache sizes for each application. For example, the operations may be repeated 10,000 times or more for each application, and in operation 574, the required cache size C is calculated as well as a probability distribution for the amount of cache needed by the array. As used herein, each repeated iteration calculates a value for C, and then the distribution is used to determine both an expected value for C (e.g., the median) along with additional percentiles. These percentiles can be used to construct an uncertainty interval (e.g. bounded by the $16^{th}$ and $84^{th}$ percentiles) to estimate the range in which most customers' cache needs will fall for the described application. This range provides a confidence level for each recommended sized configuration. The 10,000 repeat iterations is just an example, and more or less iterations can be performed. For instance, the calculation can be done twice, three times, ten times, a hundred times, hundreds of times, a few thousand times, or even many tens of thousands of times. The more times it is repeated up to some point, the distribution becomes steady state.

The sizing tool reports quantiles to describe how likely a customer is to need a specific amount of cache (e.g., see FIG. 5C). By way of example, the tool may report that 500 GB is at the 90$^{th}$ percentile in the distribution (which would mean that for approximately 90% of time 500 GB would be sufficient for the workload while approximately 10% of the time it would not be).

While the various operations in this flowchart are presented and described sequentially, one of ordinary skill will appreciate that some or all of the operations may be executed in a different order, be combined or omitted, or be executed in parallel.

FIGS. 6A and 6B illustrate example user interfaces that a storage array can render to an administrator user to determine sizing, based on known variables. By way of example, modeling can be performed using different input numbers. FIG. 6A allows a user to identify an application, e.g., VDI and then define the CPU data for the VDI application. As shown, the user may enter 10000 for the total application IOPS. If this user knows other variables, such as portion of IOPS that is reads, average read size (kB), average write size (kB), etc., the user can provide that information. If the user only knows IPOS, as shown in FIG. 6B, then the system can infer IO size and read fraction based on the application.

CPU Sizing: Via Applications:

Because customers will often not know the IO characteristics of the applications that they deploy, it is useful for to be able to infer that information from the labeled volumes that populate the install base. Much like matter, we can think of IO as having "intensive" and "extensive" properties (i.e. properties that vary based on the amount of work being done, such as total IOPS and properties that are independent of the amount of work being done, such as the average IO size or fraction of reads to total TO).

In one embodiment, since we have generated models of the hardware that use the following two sets of inputs: ro, wo, rt, and wt for Model A, and sro, swo, srt, swt, nsro, nswo, nsrt, nswt for Model B, in one example we adapt those inputs to separate out the "extensive" property of the workload (e.g., total IOPS) and keep the other stats intensive.

Figure 7A:
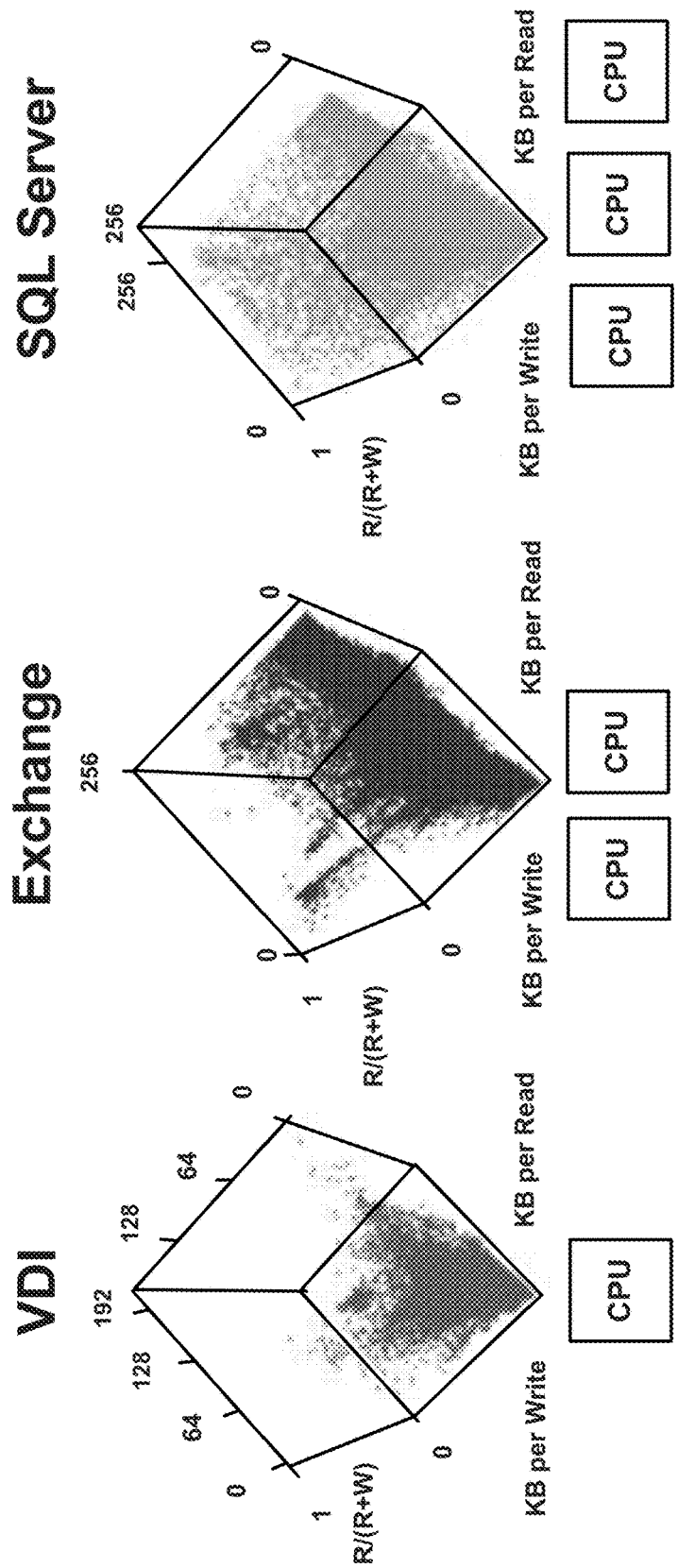
FIG. 7A shows a read fraction, average read size and average write size for ensembles of application-labeled workload-minutes, according to one embodiment.

For leveraging Model A the rearrangement means that, for a workload we want to size using the "Application name" and total application IOPS, we will collect an ensemble of array minutes from the install base for that application where we measure (i) the fraction of IO that is reads, (ii) the average read size and (iii) the average write size (see FIG. 7A).

For leveraging Model B, the rearrangement is similar, but we measure (i) the fraction of IO that is reads, (ii) the fraction of reads that are sequential, (iii) the fraction of writes that are sequential, (iv) the average sequential read size, (v) the average non-sequential read size, (vi) the average sequential write size, and (vii) the average non-sequential write size.

FIG. 7A therefore shows a read fraction, average read size and average write size for ensembles of application-labeled workload-minutes. These ensembles are used in conjunction with the user-provided "total workload IOPS" in order to size. This illustrates that different applications have different IO signatures. Also, many dimensions can describe an application's TO. Example dimensions include reads vs. writes, sequential vs. random TO, distribution of IO size, etc. These IO signatures will therefore aid in determining the CPU need. The SQL Server application, for instance will require more CPU than the Exchange application, and likewise the Exchange application will require more CPU than does the VDI application.

CPU Sizing: Example Process Overview:

At a high level, the process of sizing for CPU by application includes several example operations. For purposes of clarity, some operations may be omitted in some implementations; in other implementations, some operations may be supplemental to what is shown by way of example.

Figure 7B:
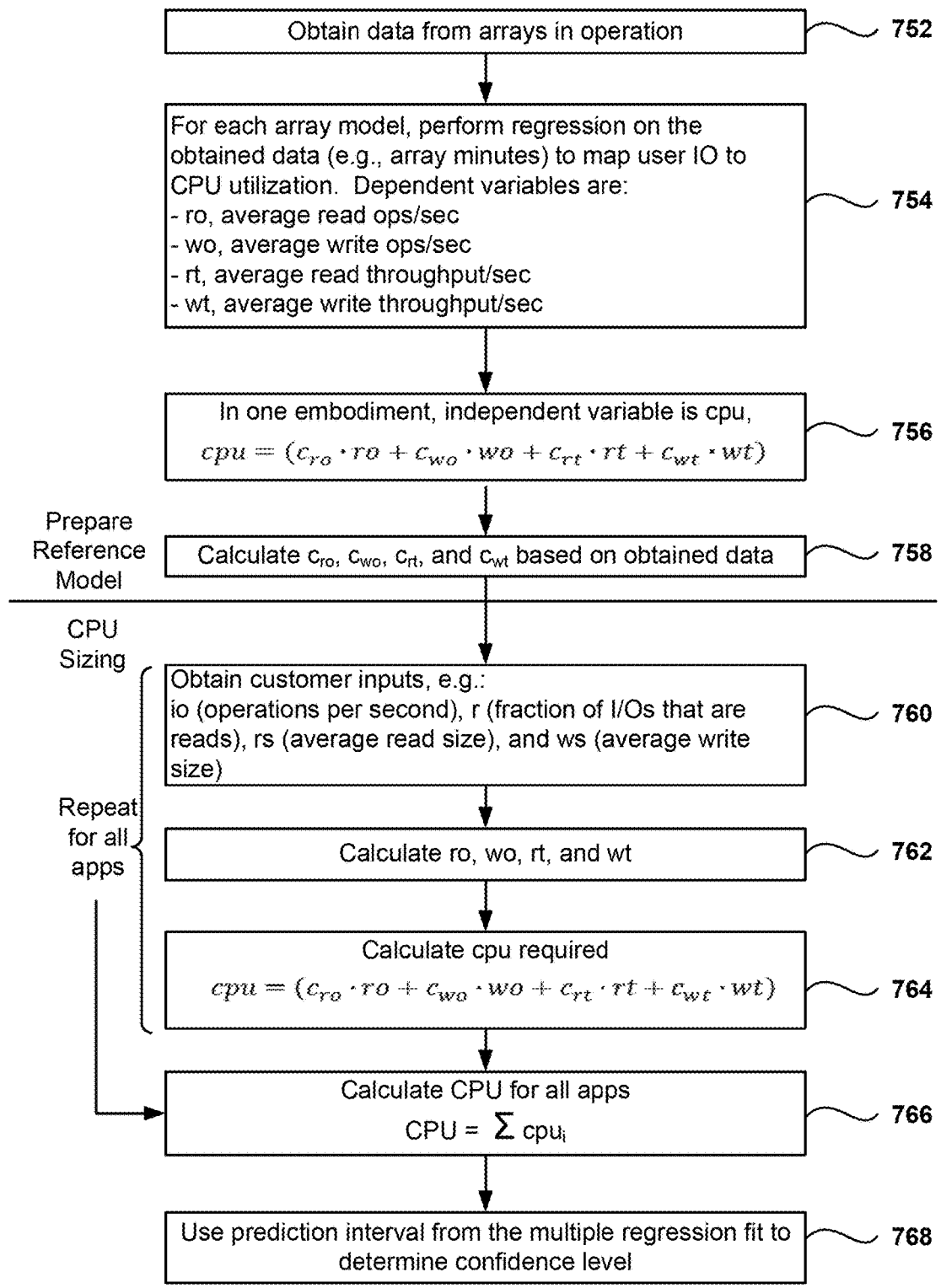
FIG. 7B is a flowchart of a method for calculating the size of CPU required for a specific system utilizing the hardware model, according to one embodiment.

FIG. 7B is a flowchart of a method for calculating the size of CPU required for a specific system utilizing the hardware model, according to one embodiment. In operation 752, data is accessed from data collected from a plurality of storage arrays that are or have been in operation.

From operation 752, the method flows to operation 754 where, for each array model, robust multiple regression is performed on the observed array minutes (utilizing only those arrays at quasi steady-state) to map user IOs to CPU utilization. In one embodiment, the dependent variables include ro (average read ops/sec), wo (average write ops/sec), rt (average read throughput/sec), and wt (average write throughput/sec).

In one embodiment, CPU utilization cpu is the dependent variable, and is calculated 756 according to the following equation:

$$cpu = (c_{ro} \cdot ro + c_{wo} \cdot wo + c_{rt} \cdot rt + c_{wt} \cdot wt)$$

From operation 756, the method flows to operation 758 where the fitting coefficients cro, cwo, crt, and cwt are calculated. The fitting coefficients cro, cwo, crt, and cwt are calculated for the ensemble of array minutes for each device model.

After the reference model has been prepared, the method flows to operation 760 where inputs are collected to size a specific system. In one embodiment, the inputs for sizing the CPU include io (operations/sec), r (fraction of I/Os that are reads), rs (average read size kb), and ws (average write size kb).

In operation 762, ro, wo, rt, and wt are calculated based on the inputs. The calculation is as follows:

$$ro = r * io$$

$$wo = (1-r) * io$$

$$rt = r * io * rs$$

$$wt = (1-r) * io * ws$$

From operation 762, the method flows to operation 764 where the CPU utilization is calculated for the given application. In one embodiment, the CPU is calculated utilizing Model A described above, as follows:

$$cpu = (c_{ro} \cdot ro + c_{wo} \cdot wo + c_{rt} \cdot rt + c_{wt} \cdot wt)$$

In another embodiment, Model B accounts for sequential and non-sequential read and write parameters. Thus, in Model B, the CPU is calculated as follows:

$$cpu = (c_{sro} \cdot sro + c_{swo} \cdot swo + c_{srt} \cdot srt + c_{swt} \cdot swt) + (c_{nsro} \cdot nsro + c_{nswo} \cdot nswo + c_{nsrt} \cdot nsrt + c_{nswt} \cdot nswt)$$

Operation 760, 762, and 764 are repeated for all the applications, and in operation 766 the total CPU required is calculated as the sum of the CPU required for all the required applications. From operation 766, the method flows to operation 768, where the prediction interval, from the multiple regression fits performed in the reference model, is used to determine confidence level on CPU requirements for the different array models.

Figure 7C:
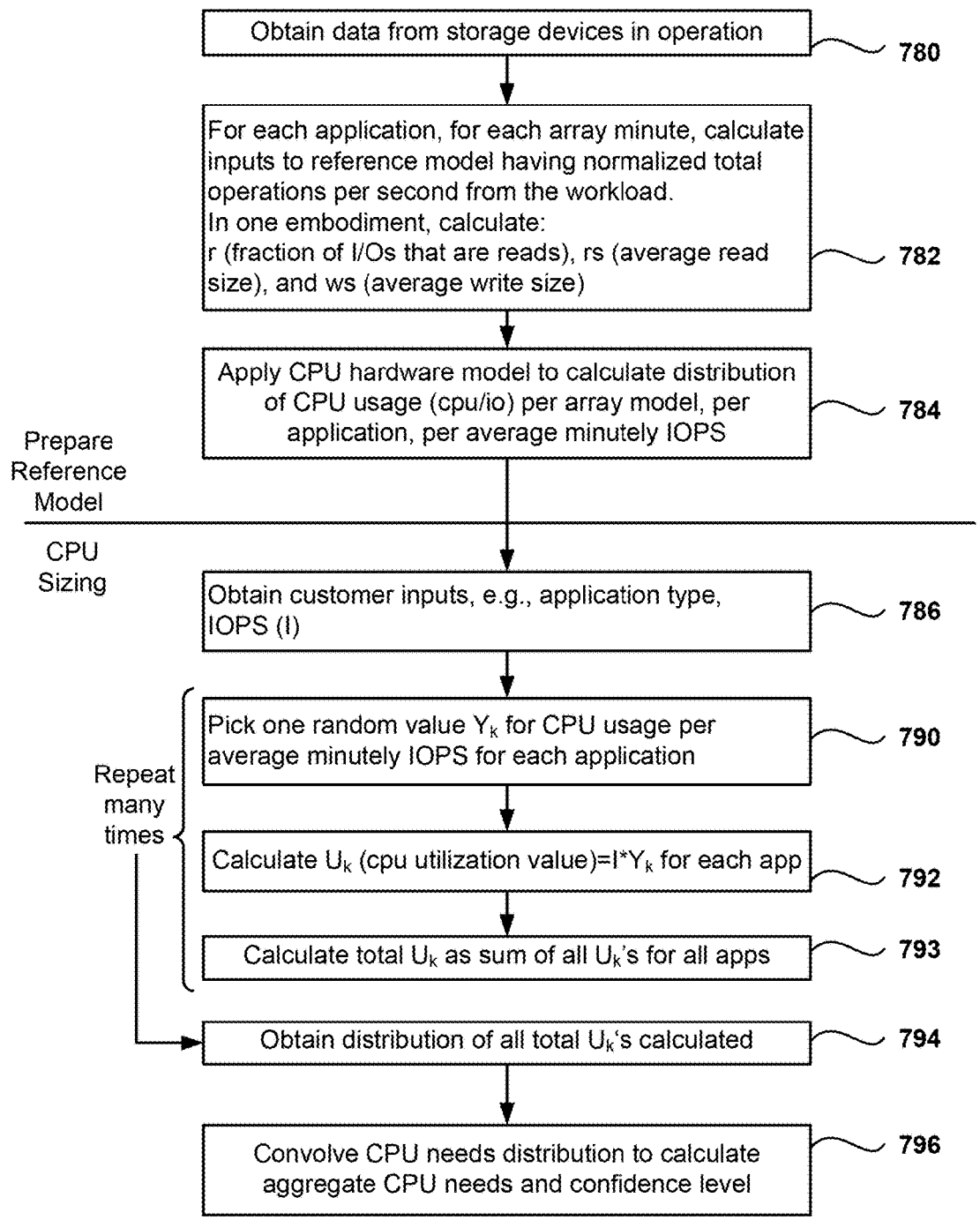
FIG. 7C is a flowchart of a method for calculating the size of CPU required for a specific system utilizing the workload model, according to one embodiment.

FIG. 7C is a flowchart of a method for calculating the size of CPU required for a specific system utilizing the workload model, according to one embodiment. In operation 780, data is accessed from data collected from a plurality of storage arrays that are or have been in operation.

In operation 782, for each application, the inputs to the reference model are calculated having normalized out the total operations/sec (cpu) with reference to IOPS. In one embodiment, the following are calculated: r (fraction of I/Os that are reads), rs (average read size), and ws (average write size), for each array minute for the subset of volumes running the same application.

From operation 782, the method flows to operation 784 where the CPU hardware model is applied in order to calculate the distribution of CPU usage per array model, per application, and per average minutely IOPS. In operation 784, the distributions obtained for each device type and per each application, are used for the hardware model, but these distributions are normalized with reference to the IOPS of the array, i.e., the distributions are based on cpu/io. Therefore, both sides of the cpu-calculation equation are divided by io, as follows:

$$\frac{cpu}{io} = \left(c_{ro} \cdot \frac{ro}{io} + c_{wo} \cdot \frac{wo}{io} + c_{rt} \cdot \frac{rt}{io} + c_{wt} \cdot \frac{wt}{io}\right)$$

This equation of the normalized cpu can be rewritten as follows:

$$\frac{cpu}{io} = (c_{ro} \cdot r + c_{wo} \cdot (1-r) + c_{rt} \cdot r \cdot rs + c_{wt} \cdot (1-r) \cdot ws)$$

With operation 784 completed, the reference model is ready to be applied for a specific set of requirements.

In operation 786, customer inputs are obtained for sizing a particular system. In one embodiment, the customer inputs include the application type and the average minutely IOPS (I). In operation 790, the method picks one random value ($Y_k$) for the normalized CPU usage per average minutely IOPS (cpu/io), for each selected application. The sizing tool picks an array minute from the distribution of points in the workload ensembles as represented in FIG. 7A.

From operation 790, the method flows to operation 792 where the CPU utilization $U_k$ for each application is calculated by multiplying $I^*Y_k$, for each application. In operation 793, the total system $U_k$ is calculated as the sum of all the $U_k$'s obtained for the respective applications.

Operations 790, 792 and 793 are repeated a plurality of times for different values of k (e.g., 10,000), and in operation 794, a distribution of total system $U_k$ values is obtained. The repeating works to produce a plurality of total $U_k$ values, and then a statistical measure is selected (e.g., median, average) representing the CPU needed for the system. As noted above, when the iterations are performed, more or less may be made, and 10,000 is only one example. In operation 796, the CPU needs distributions from each application are convolved with one another to obtain the distribution of estimated CPU usage for the combination of all of the described applications. Once the sizing tool repeats operations 790, 792, and 793 for each application (i.e., workload) planned for the array, the convolution of the distributions from each application is accomplished by (1) picking an individual prediction of CPU need from each application's distribution, (2) summing the CPU utilization percentage value picked from each application's distribution, and (3) repeating 1 & 2 a large number of times to form a distribution of combined CPU need for all applications, similar to the convolution process described for cache sizing above. For CPU sizing, this process to determine the CPU needed is repeated for each controller type since separate CPU needs distributions will be constructed for each.

The sizing tool reports the expected CPU utilization percentage % for each controller type along with a lower and upper bounds of the 68% confidence interval to describe how likely a customer is to fall within a certain range of CPU utilization on a particular configuration.

In one embodiment, when the upper bound of the 68% confidence interval exceeds a set headroom threshold (e.g., about 80%) for a particular array controller type, the sizing tool will divide the workload into successively smaller chunks until it identifies a number of controllers of each type that will satisfy the proposed workload while leaving a comfortable headroom on each system.

FIG. 8 provides an example display of the sizing tool for controller sizing output. This illustration expresses the number of arrays of each type and the expected CPU utilization that would be observed for the proposed workload. The unfilled bar under "expected CPU util. per array (%)" is a quantification of expected remaining headroom. Quantification of uncertainty based on install-base variability is shown in the column for 68% C.I. This also allows for comparisons, which enable decisions to be made on whether to scale-out (e.g., use of multiple storage arrays) or scale up (e.g., use a higher performance/capacity storage array). For example, using 1 CS200 Series storage array will not be sufficient, as the expected CPU utilization exceeds 100%. If two CS200 Series storage arrays are used, the expected CPU utilization is about 81%, still above the 68%. If three CS200 Series storage arrays are used, then the CPU utilization falls to about 54%, which would be acceptable, if the user wishes to scale-out by using three storage arrays. If the use instead wishes to scale-up, a more powerful CPU in a higher end storage array, e.g., CS400, CS500, or CS700, may be used, all of which provide sufficient CPU utilization as 32%, 22%, and 15%, respectively. Note, however, that scaling-up to a CS500 or CS700 will likely produce a situation where CPU has been over provisioned for the workloads expected for the storage implementation. The recommendations, marked with a check mark, therefore provide users with the ability to size the correct storage array, based on their actual needs, as predicted by implementing the embodiments of the present disclosure. As used herein, reference to model numbers CSxxx, refer to a brand series of storage arrays that made by the assignee of the present application, and this disclosure is not tied to any specific series or model of controller or storage array. The methods and systems disclosed herein are thus applicable to any storage system from any manufacturer, regardless of storage array model or name.

Model Cross-Validation

To ensure that the sizing estimates produced by the tool correspond well to the cache needs of actual arrays in the field, the set of arrays with more than 50% of their data falling into one of the 7 application classes were sized for cache in an automated fashion using the cache sizing procedure described above. The results are illustrated in the tables provided in FIGS. 9A and 9B. Since the sizing tool produces expected "cache needed" distributions, we determined whether the quantiles of these distributions aligned with the observed distributions from the pool of all arrays with more than 50% of classified data (e.g., 230 arrays) as well as specific subsets of arrays corresponding to specific demographics: arrays that were (i) more than 50% Exchange, (ii) more than 50% VDI, (iii) more than 50% Windows File Server (iv) more than 50% of Database (i.e. SQL Server+Oracle+Sharepoint+Other DB) and (v) less than 50% of any of the prior categories (i.e. arrays with mixed workloads). Each of these demographic sets demonstrated reasonable correspondence at the 20%, 10% and 5% quantiles.

Exemplary Storage Array Systems and Configurations

Figure 10:
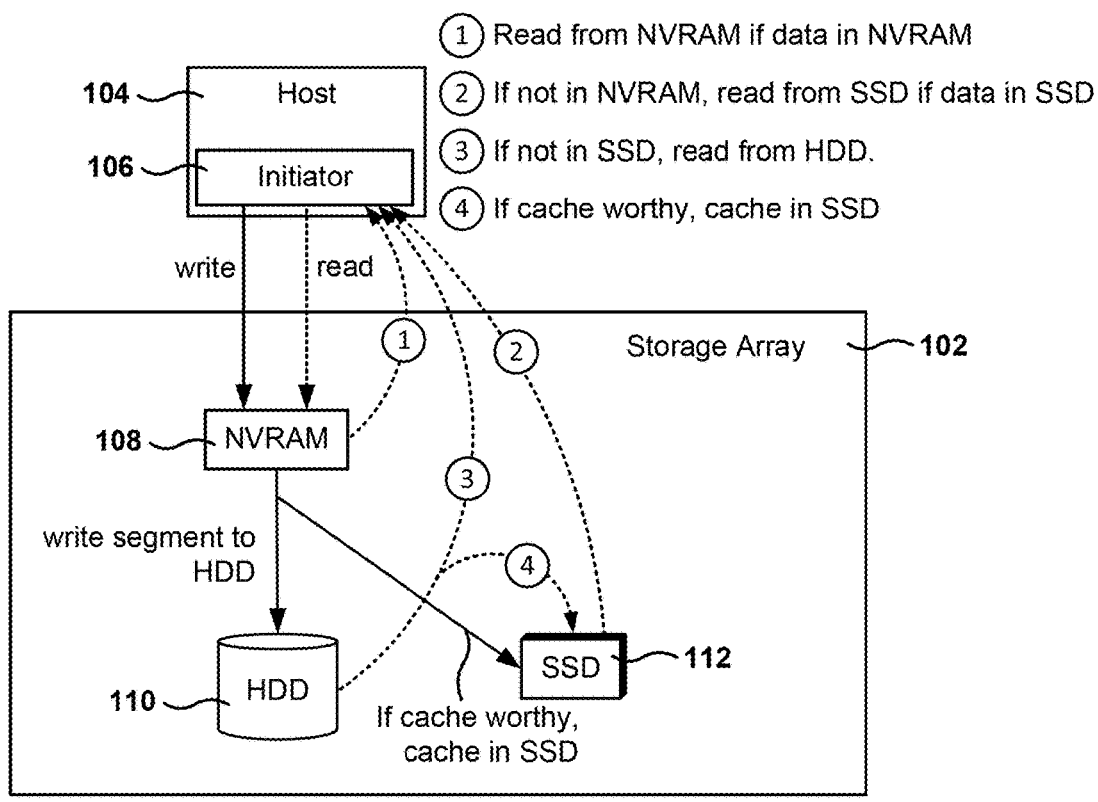
FIG. 10 illustrates the read and write paths within the storage array, according to one embodiment.

FIG. 10 illustrates the read and write paths within the storage array, according to one embodiment. Regarding the write path, the initiator 244 in the host 204 sends the write request to the storage array 202. As the write data comes in, the write data is written into NVRAM 218, and an acknowledgment is sent back to the initiator (e.g., the host or application making the request). In one embodiment, storage array 202 supports variable block sizes. Data blocks in the NVRAM 218 are grouped together to form a segment that includes a plurality of data blocks, which may be of different sizes. The segment is compressed and then written to HDD 226. In addition, if the segment is considered to be cache-worthy (i.e., important enough to be cached or likely to be accessed again) the segment is also written to the SSD cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 202. The requested data may be found in any of the different levels of storage mediums of the storage array 202. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

Figure 11:
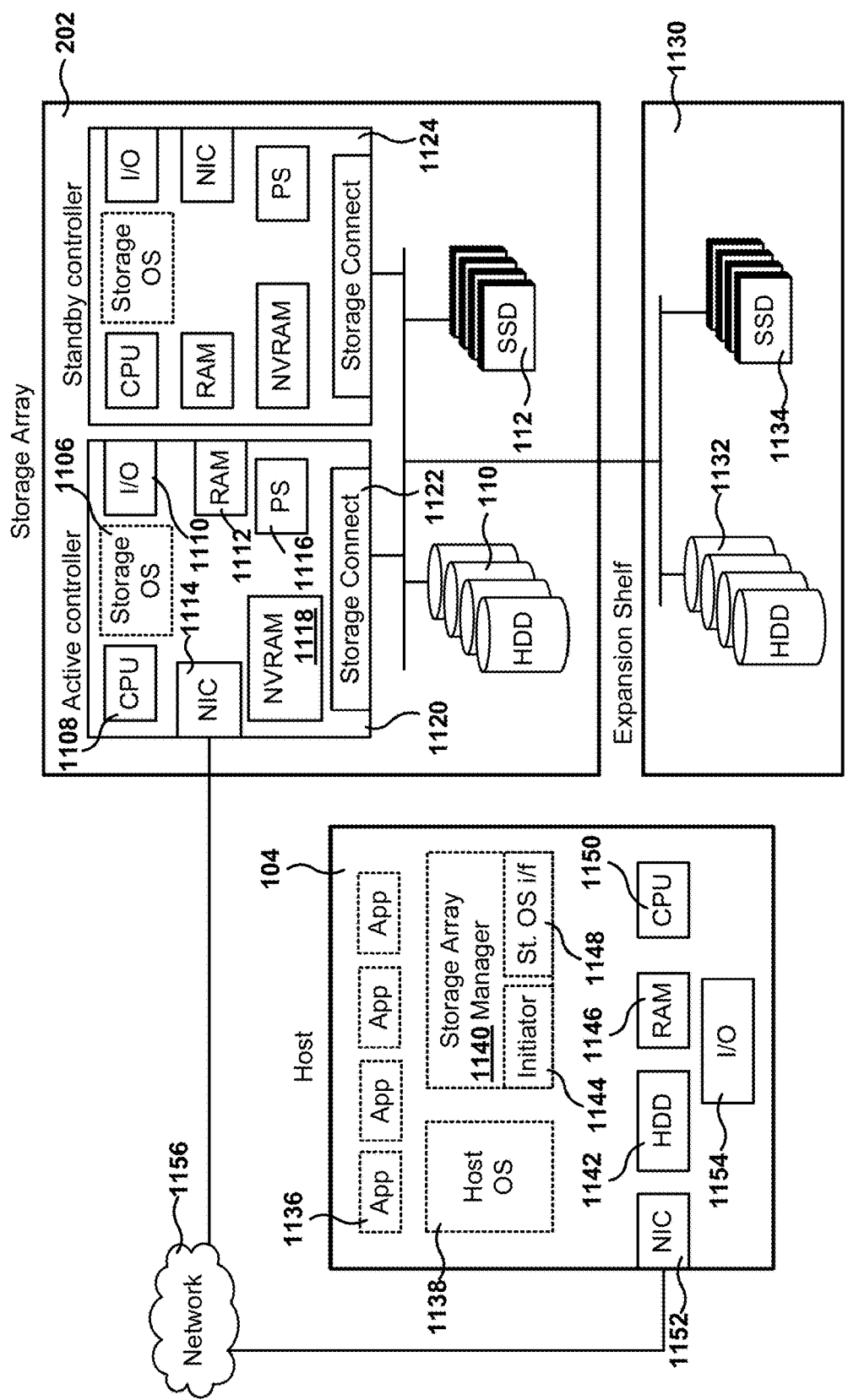
FIG. 11 illustrates the architecture of a storage array, according to one embodiment.

FIG. 11 illustrates the architecture of a storage array, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, standby controller 224 includes the same components as active controller 220.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., IO requests) are sent over network 256, and the storage array 202 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 202 to applications 236. Storage array manager 240 includes an initiator 244 and a storage OS interface program 248. When an IO operation is requested by one of the applications 236, the initiator 244 establishes a connection with storage array 202 in one of the supported formats (e.g., iSCSI, Fibre Channel, or any other protocol). The storage OS interface 248 provides console capabilities for managing the storage array 202 by communicating with the active controller 220 and the storage OS 206 executing therein.

To process the IO requests, resources from the storage array 202 are required. Some of these resources may be a bottleneck in the processing of storage requests because the resources are over utilized, or are slow, or for any other reason. In general, the CPU and the hard drives of the storage array 202 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

The hard disks may also become a bottleneck because the inherent access speed to data is slow when compared to accessing data from memory (e.g., NVRAM) or SSD 228. Embodiments presented herein are described with reference to CPU and HDD bottlenecks, but the same principles may be applied to other resources, such as a system with insufficient amount of NVRAM.

Figure 12:
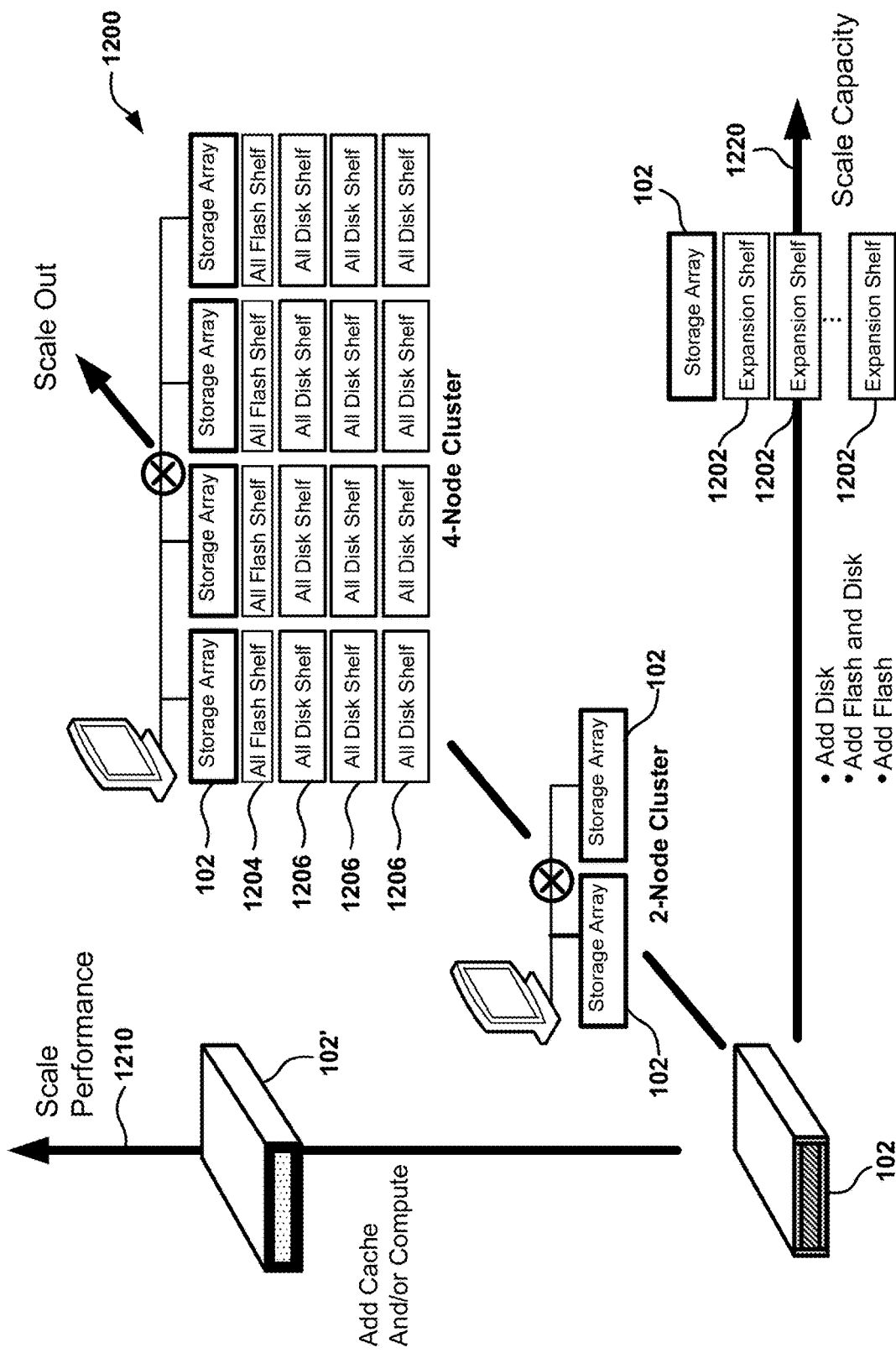
FIG. 12 is an example of the flexibility of the storage array, which can be expanded for scaling performance and for scaling capacity.

FIG. 12 is an example of the flexibility of the storage array, which can be expanded for scaling performance and for scaling capacity. In this illustration, the storage array can be adjusted to add cache and/or compute resources to define a more powerful storage array 102'. In one example, instead of upgrading the storage array 102, an upgraded storage array 102 can take its place to provide additional processing power (e.g., more powerful CPUs, higher capacity NVRAM, higher capacity DRAM, improved storage enclosure routing and buses, improved fan speeds, modified enclosure (e.g., chassis) heights (U1, U2, U3, etc.), different power supplies, and/or other redundancy and/or memory and/or processing infrastructure.

In one embodiment, if the storage array requires additional disk or storage or flash storage memory, the storage array can be expanded to scale out 1220 by adding expansion shelves 1202 to the storage array 102. As discussed above, the expansion shelves 1202 may be defined by all-disk shelves (ADS) or all-flash shelves (AFS), or combinations of ADS and AFS shelves.

In a further example, the flexibility of the storage array 102 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 12.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 102, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

Figure 13:
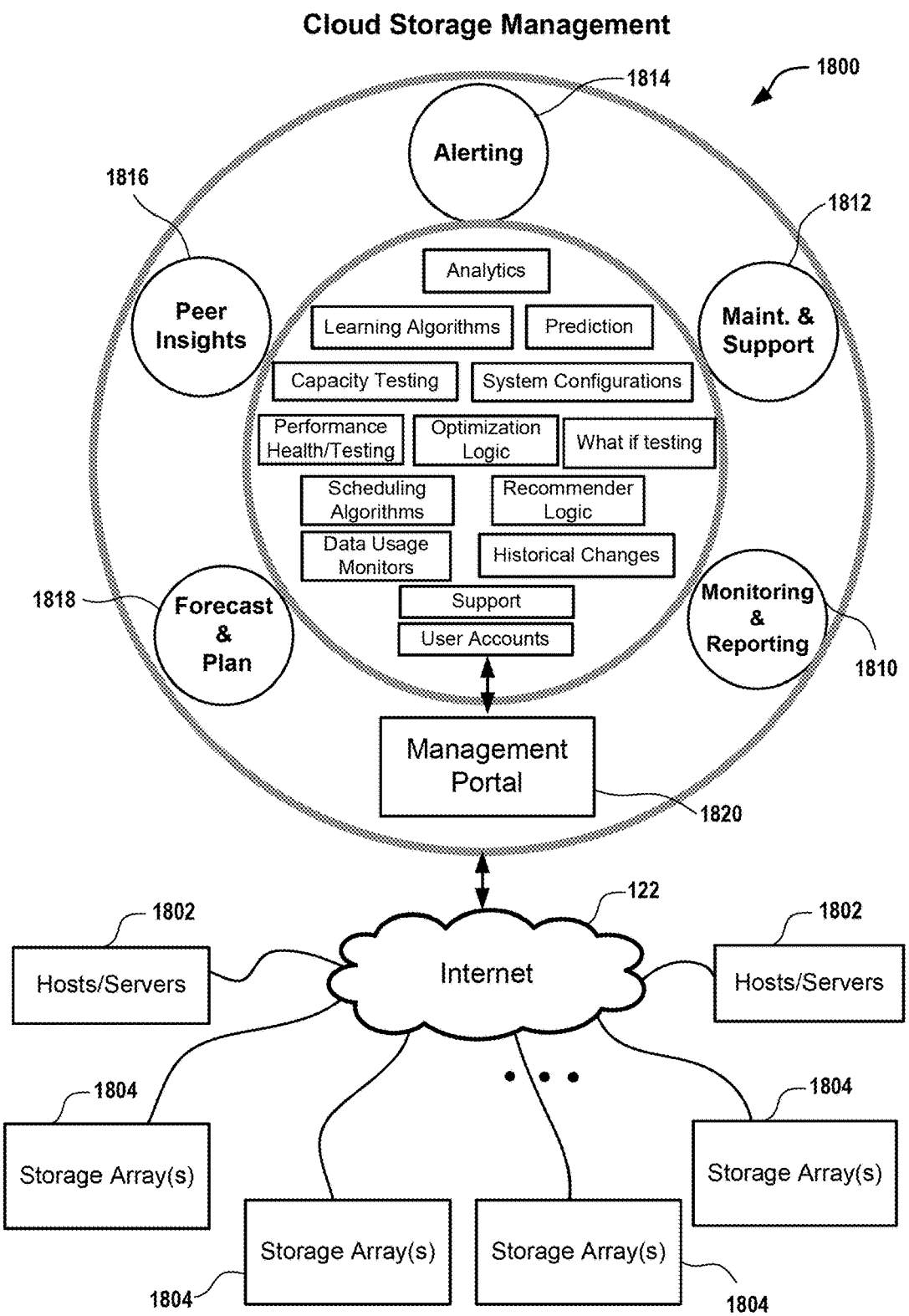
FIG. 13 illustrates an example of a cloud storage management system, which utilizes cloud storage processing to enable remote management of storage arrays, in accordance with one or more embodiments.

FIG. 13 illustrates an example of a cloud storage management system, which utilizes cloud storage processing to enable remote management of storage arrays, in accordance with one or more embodiments. The cloud storage management system 1800 executes a management portal 1820 which provides access over the Internet, or local area networks (LAN), or wide area networks (WAN), and combinations thereof.

As shown, exemplary hosts and servers 1802 are in communication with the Internet and are configured to provide services to a plurality of clients. As noted above, the clients access the Internet to utilize applications, services, processing, content, and share information and data. The data being accessed and shared or processed may be stored in a plurality of storage arrays 1804. Each storage array 1804 can be defined as a single storage array 102, or can be a storage array 102 that has been expanded with one or more expansion shelves.

Additionally, storage array 102 can also be part of a cluster of storage arrays, as described above. In either case, management of the storage arrays is facilitated by providing access to the storage array by way of a management portal 1820. For example, the storage arrays are connected to a network, and in turn share information with a cloud storage management system 1800. The cloud storage management system 1800 is configured to execute a plurality of functions and algorithms to facilitate management of the storage arrays which may be deployed in various configurations, locations, implementations, and other constructs.

For example, some storage arrays may be part of a cluster, some storage arrays may be part of a data center, some storage arrays may be servicing a small business, some storage arrays may be clustered to provide application services to certain companies or users, and some storage arrays may be utilized for providing real-time data to various applications over the Internet, such as on-demand applications, websites, streaming networks, video content delivery systems, audio content delivery systems, database information, business metrics, remote desktop applications, virtualized network infrastructures, and other storage related functions and/or Internet and website related processing.

Given that the storage arrays can be deployed and implemented in various sites, configurations, and for different functions, the configurations selected by various implementers of the storage can be optimized utilizing the learned information from various other implementations that may be outside of the current implementation. For example, the cloud storage management system 1800 may be managed by a provider that supplies storage arrays. However, the management of the storage arrays and optimization of the use of the storage arrays can be facilitated by way of the cloud storage management system 1800, without modifying or accessing the actual data being stored by the storage arrays 1804, by various users and implementers of the storage arrays.

In some implementations, the cloud storage management 1800 can include and process various modules to assist in efficient management of storage arrays 1804. Without limitation, the following are certain types of processing algorithms and methods that can be executed by the cloud storage management system 1800, based on data received from the various storage arrays 1804, and their interface with a management portal 1820. These examples can include analytics processing to determine usage of the storage arrays, similarities in usage of the storage arrays by other end-users, performance of applications by other end users by the storage array when certain configurations are set, and other modifications and analytics associated therewith. Still further, the cloud storage management system 1800 can also include logic for processing learning algorithms.

The learning algorithms can be utilized to determine when certain configurations of a storage array should be implemented, based on previous settings and/or changes made by the same implementer of the storage array or by looking for similarities and changes made or settings made by other storage array implementers or users. Algorithms can also be used to predict when certain settings should be changed to storage arrays. For example, if a certain storage array system gets upgraded when 80% of the disk storage has been utilized, recommendations can be provided by recommendation logic that certain upgrades are more efficient than other upgrades. These predictions can be ranked based on the success of certain upgrades by other storage array users over time, and based on the success experienced by such specific upgrades and/or changes.

In another embodiment, capacity testing can also be performed by the cloud storage management system 1800, and this testing can occur based on the demands being made on the storage arrays, the types of applications being run, and the stress that the storage arrays have been placed under. System configurations can also be reviewed dynamically by the cloud storage management system so as to determine if the right consistent configurations have been set, and/or provide recommendations for changes. Additional performance and health testing algorithms can also be run by querying and sending data, commands, analytics requests and other logic and data to and from the storage arrays 1804. By obtaining data from the storage arrays regarding their operation, settings, health, capacity, system configurations, it is possible to generate optimized data and/or logic that can be recommended or set on the storage arrays.

In one embodiment, recommendations can be sent to the storage arrays or their management personnel, who may determine to implement or not implement certain recommendations and/or settings. In other embodiments, certain upgrades, changes, modifications and/or the like, can be implemented based on predefined settings, authorizations, or implicit settings and/or authorizations by the user, IT manager, storage manager, data center manager, or other authorized storage management personnel. Still further, the cloud storage management system 1800 can also manage historical changes made on specific storage arrays, and determine when changes have been successful or have reduced the performance and/or goal desired by the implementing individual for their storage arrays.

By analyzing historical changes and/or data from various storage arrays, even when the storage arrays are owned and/or operated by different entities, it is possible to identify optimizations at cross points or intersections of efficiencies, and such data can be used to provide recommendations for improved optimizations. The system can also include scheduling algorithms which can be used to automatically communicate with the storage arrays, collect data, run applications, run logic, collect data, send optimizations, make recommendations, and/or adjust settings. In some embodiments, the management portal can also access support data which may be optimized for specific user accounts. For example, some analytics, data processing, optimizations, what if testing, recommender logic, and other functions can be limited to specific accounts, based on their level of service desired. In some embodiments, higher levels of service or support can be given higher levels of feedback by the cloud storage management system 1800.

Broadly speaking, the functionality of the various algorithms managed by the cloud storage management system 1800 can be used to provide specific functionality. Example functionality may include monitoring and reporting functions 1810, maintenance and support functions 1812, alerting functions 1814, peer insights 1816, and forecasting and planning 1818. These various functions can take and use logic described above and defined within the inner diagram of the cloud storage management system 1800. In various examples, the portal management can provide access to the plurality of user interface screens with selection boxes, setting boxes, metrics analysis, diagrams, charts, historical data, alerts, recommendations, and other user interface and/or command-line data. In some embodiments, the data received from storage arrays is metadata, and this metadata is stored in databased that are accessible by one or more servers of the cloud system.

In one embodiment, the storage lifecycle data (e.g., historical data, metadata, etc.) is leveraged to enable deep analysis of data regarding a storage array. This analysis enables the automation and integration of data mining from storage array usage and functionality to automate and simplify storage administrative tasks. For instance, by analysis of metadata across various installed storage arrays, it is possible to predict when configuration issues may arise for particular customer arrays. In some embodiments, this information may be used to determine when upgrades from one configuration (e.g., software and/or hardware) are recommended or when certain upgrades should be avoided. In one embodiment, having access to metadata of other arrays (e.g., across many disparate installations) allows for efficient diagnosis of current issues, potential issues or recommendations to ensure optimal health of particular arrays.

This information is especially useful when the operator of the storage system is unfamiliar with settings or is unable to predict proper utilization of the storage array (e.g., or the storage usage changes over time). As noted above, this simplification of the management of the storage array is provided by deep data analytics technologies, which are executed in a cloud management system. This enables the cloud management system to analyze millions of data points every day to build a complete and continually growing data set of metrics usable to manage overall storage health, and/or array configuration, and/or array updates/upgrades, and/or array groups, and/or array pools, and/or array clusters, and/or storage software/firmware.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for sizing a solid state drive (SSD) cache to be used in a storage array, the method comprising:
   collecting, by a processor of a computing device, metadata of storage arrays when the storage arrays are in use by applications operating in a plurality of working environments;
   classifying, by the processor, the collected metadata of the storage arrays according to each of the applications;
   based on the classified metadata of the storage arrays for each of the applications, determining, by the processor, a best-fit linear model of a distribution of working set sizes for each of the applications and a distribution of read ratios for random input/outputs (I/Os) for each of the applications;
   receiving, by the processor, inputs for sizing the SSD cache of the storage array for a user system, the inputs identifying a first application and a second application to be used in the user system, a volume of data expected to be used for the first and second applications, and a desired cache hit rate;
   selecting, by the processor, a random offset value relative to the best-fit linear model of the distribution of working set sizes for each of the first and second applications;
   selecting, by the processor, a random read ratio from the distribution of read ratios for each of the first and second applications;
   calculating, by the processor, a working set size for each of the first and second applications based on the selected random offset value and the volume of data received at the inputs;
   calculating, by the processor, an SSD cache size for each of the first and second applications based on the calculated working set size, the selected random read ratio, and the desired cache hit rate;
   calculating, by the processor, a total SSD cache size by summing the calculated SSD cache sizes for the first and second applications; and
   outputting the total SSD cache size as an expected SSD cache size in the storage array for the user system.

2. The method of claim 1, further comprising,
   calculating a confidence level for the expected SSD cache size based on a range of percentiles associated with the total SSD cache size.

3. The method as recited in claim 1, wherein calculating the working set size includes multiplying the random offset value by a first number, wherein the first number is the volume of data to a power of a slope of the best-fit linear model.

4. The method of claim 3, wherein, to account for compression, the volume of data is multiplied by a compression rate to define a compressed volume of data, and said working set size is calculated by multiplying the random offset size by a second number, wherein the second number is the compressed volume of data to a power of the slope of the best-fit linear model.

5. The method of claim 1, wherein the distribution of read ratios is defined as a number of input/outputs (I/Os) that are reads divided by a total number of I/Os.

6. The method of claim 1, further comprising:
   executing an iterative process that repeats the selecting of the random offset value and the random read ratio and the calculating of the working set size and the SSD cache size to produce a plurality of total SSD cache sizes; and
   generating a median SSD cache size from the plurality of total SSD cache sizes, wherein the median SSD cache size being the expected SSD cache size in the storage array for the user system.

7. A method for sizing a cache of a storage array, the method comprising:
   collecting, by a processor of a computing device, metadata of storage arrays when the storage arrays are in use by applications operating in a plurality of working environments;
   classifying, by the processor, the collected metadata of the storage arrays according to each of the applications;
   based on the classified metadata of the storage arrays for each of the applications, determining, by the processor, a best-fit linear model of a distribution of working set sizes for each of the applications and a distribution of read ratios for random input/outputs (I/Os) for each of the applications;
   receiving inputs for sizing the cache of the storage array for a user system, the inputs indicating a first application and a second application to be used in the user system, a volume of data expected to be used for the first and second applications, and a desired cache hit rate;
   selecting, by the processor, a read ratio at random for each of the first and second applications based on application behavior parameters;
   calculating, by the processor, a working set size for each of the first and second applications based on a random offset value and the volume of data; and
   calculating, by the processor, a cache size for each of the first and second applications based on the working set size, the inputs, the read ratio selected at random, and the application behavior parameters;
   calculating, by the processor, a total SSD cache size by summing the calculated SSD cache sizes for the first and second applications; and
   outputting the total cache size as an expected cache size in the storage array for the user system.

8. The method of claim 7, wherein the metadata includes operational parameters produced when the storage arrays are in operation, the operational parameters further relate to applications served by the storage arrays over time and hardware configurations of the storage arrays that include sizes of cache.

9. The method of claim 7, wherein the cache is a solid state drive (SSD) cache used as a read cache in the storage arrays, the storage arrays further including hard disk drives (HDDs).

10. The method as recited in claim 7, further including:
    calculating a confidence level for the expected cache size based on a range of percentiles associated with the total cache size.

11. The method as recited in claim 7, wherein the application behavior parameters further include a distribution of read ratio values for random input/outputs per application, and a distribution of compression rates per application, and wherein, to account for compression, the volume of data is multiplied by a random compression rate selected from the distribution of compression rates to define a compressed volume data.

12. The method as recited in claim 7, further including:
calculating a compressed volume of data by multiplying the volume of data by a compression rate; and
wherein the calculating of the working set size is by multiplying the random offset value by a number, wherein the number is the compressed volume of data to the power of the estimated fitting parameter.

13. The method as recited in claim 7, wherein calculating the working set size includes multiplying the random offset value by a number, wherein the number is the volume of data to a power of an estimated fitting parameter.

14. The method of claim 7, further comprising:
executing an iterative process that repeats the selecting of the random offset value and the read ratio and the calculating of the working set size and the cache size to produce a plurality of total cache sizes; and
generating a median cache size from the plurality of total cache sizes, the median cache size being the expected cache size in the storage array for the user system.

15. A non-transitory computer readable medium storing instructions that when executed by a processor cause the processor to:
collect metadata of storage arrays when the storage arrays are in use by applications operating in a plurality of working environments;
classify the collected metadata of the storage arrays according to each of the applications;
based on the classified metadata of the storage arrays for each of the applications, determine a best-fit linear model of a distribution of working set sizes for each of the applications and a distribution of read ratios for random input/outputs (I/Os) for each of the applications;
receive inputs for sizing a cache of a storage array, the inputs identifying a first application and a second application to be used to store data in the storage array, a volume of data to be used for the first and second applications, and a desired cache hit rate;
select a random read ratio from the distribution of read ratios for random inputs/outputs associated with the storage array;
calculate a working set size for each of the first and second applications based on a random offset value and the volume of data;
calculate a cache size for each of the first and second applications based on the working set size, the random read ratio, and the inputs;
calculate a total SSD cache size by summing the calculated cache sizes for the first and second applications; and
output the total cache size as an expected cache size in the storage array for a user system.

16. The non-transitory computer readable medium of claim 15, wherein the instructions are to cause the processor to:
access a database that stores the metadata related to the storage arrays and the applications served by the storage arrays, the metadata includes sizes of caches in the storage arrays; and
analyze the metadata in the database to determine the distribution of read ratios for the random input/outputs.

17. The non-transitory computer readable medium of claim 15, wherein the instructions are to cause the processor to:
calculate a confidence level for the expected cache size based on a range of percentiles associated with the total cache size.

18. The non-transitory computer readable medium of claim 15, wherein, to account for compression, the instructions are to cause the processor to multiply the volume of data by a compression rate to define a compressed volume data, and calculate the working set size by multiplying the random offset size by the compressed volume data.

19. The non-transitory computer readable medium of claim 15, wherein to calculate the working set size for each of the first and second applications, the instructions are to cause the processor to multiply the random offset value by the volume of data to a power of an estimated fitting parameter.

20. The non-transitory computer readable medium of claim 15, the instructions are to cause the processor to execute an iterative process that repeats the selecting of the random read ratio and the calculating of the working set size and the cache size to produce a plurality of cache sizes; generate a median cache size from the plurality of cache sizes, the median cache size being the expected cache size to be used in the storage array.

* * * * *